United States Patent
Watt et al.

(10) Patent No.: US 12,423,574 B2
(45) Date of Patent: Sep. 23, 2025

(54) SYSTEM AND METHOD FOR WEATHER DEPENDENT MACHINE LEARNING ARCHITECTURE

(71) Applicant: ROYAL BANK OF CANADA, Toronto (CA)

(72) Inventors: Graham Alexander Watt, Toronto (CA); Ehsan Amjadian, Toronto (CA)

(73) Assignee: Royal Bank of Canada, Toronto (CA)

( * ) Notice: Subject to any disclaimer, the term of this patent is extended or adjusted under 35 U.S.C. 154(b) by 1160 days.

(21) Appl. No.: 17/179,365

(22) Filed: Feb. 18, 2021

(65) Prior Publication Data
US 2021/0256378 A1     Aug. 19, 2021

Related U.S. Application Data

(60) Provisional application No. 62/978,074, filed on Feb. 18, 2020.

(51) Int. Cl.
*G06N 3/08* (2023.01)
*G06N 3/044* (2023.01)
*G06N 3/045* (2023.01)

(52) U.S. Cl.
CPC ........... *G06N 3/08* (2013.01); *G06N 3/044* (2023.01); *G06N 3/045* (2023.01)

(58) Field of Classification Search
None
See application file for complete search history.

(56) References Cited

U.S. PATENT DOCUMENTS

| | | | | |
|---|---|---|---|---|
| 8,280,633 | B1* | 10/2012 | Eldering | G06Q 40/08 |
| | | | | 702/3 |
| 2006/0031182 | A1* | 2/2006 | Ryan | G06N 5/04 |
| | | | | 706/50 |
| 2013/0054495 | A1* | 2/2013 | Hawkins | G06N 20/00 |
| | | | | 706/12 |
| 2013/0268420 | A1* | 10/2013 | Ong | G06Q 40/00 |
| | | | | 705/35 |
| 2018/0089563 | A1* | 3/2018 | Redding | G06N 5/01 |

(Continued)

OTHER PUBLICATIONS

Shi et al., "A hybrid model using LSTM and decision tree for mortality prediction and its application in provider performance evaluation," 2019 IEEE International Conference on Big Data (Big Data), 2019, pp. 2773-2781 (Year: 2019).*

(Continued)

*Primary Examiner* — Abdullah Al Kawsar
*Assistant Examiner* — Asher H. Jablon
(74) *Attorney, Agent, or Firm* — Norton Rose Fulbright Canada LLP; Brian Chau

(57) ABSTRACT

A machine learning architecture is proposed that is directed to receive different time-series data sets relating to environmental conditions as well as a target variable for prediction and to transform the time-series data sets for training a plurality of different machine learning models. The trained machine learning models can be utilized to probe various configurations of environmental conditions, and in some embodiments, conduct first and second order co-efficient of variation determinations to generate one or more data values representative of environmental condition sensitivity metrics.

20 Claims, 16 Drawing Sheets

(56) References Cited

U.S. PATENT DOCUMENTS

2018/0107927 A1* 4/2018 Frey .................... G06N 3/08
2020/0051140 A1* 2/2020 Sherif ............... G06Q 30/0203

OTHER PUBLICATIONS

Bouwer, LM, Projections of future extreme weather losses under changes in climate and exposure, Risk Analysis, vol. 33 No. 5, 2013, pp. 915-930.

Koesdwiady, Arief & Soua, Ridha & Karray, Fakhreddine, Improving Traffic Flow Prediction With Weather Information in Connected Cars: a Deep Learning Approach, IEEE Transactions on Vehicular Technology, vol. 65 No. 12, Dec. 2016.

* cited by examiner

- Raw One-Hot-Encoding

- Date-time Features Extraction (Proposed Applied Method)
  ➢ Extract Only a Few Limited Features from Date-time

1200 ⤸

```
┌─────────────────────────┐
│   Transaction Revenue   │
│  Forecast Given Weather │
└─────────────────────────┘

┌─────────────────────────┐
│   Quantified Weather    │
│   Sensitivity Forecast  │
└─────────────────────────┘

┌─────────────────────────┐
│    Quantified Climate   │
│   Sensitivity Forecast  │
└─────────────────────────┘

┌─────────────────────────┐
│Climate Scenario Transaction│
│     Revenue Forecast    │
└─────────────────────────┘
```

FIG. 12

SYSTEM AND METHOD FOR WEATHER DEPENDENT MACHINE LEARNING ARCHITECTURE

CROSS-REFERENCE

This application is a non-provisional of, and claims all benefit, including priority to: U.S. Application No. 62/978,074, filed Feb. 18, 2020, entitled: "SYSTEM AND METHOD FOR WEATHER DEPENDENT MACHINE LEARNING ARCHITECTURE", incorporated herein by reference in its entirety.

FIELD

The present disclosure relates to the field of machine learning data architecture, and more specifically, to systems and methods adapted for training machine learning models with cost functions comprising a normalization term.

INTRODUCTION

Weather data can comprise a multiplicity of features over a large time scale and is location dependent. Utilizing time series data to predict weather events and the consequences associated with weather events is challenging given the scale of data and the difficultly in determining relevant time scales for use. Weather data's geo-spatial variability leads to challenges in training a neural network that will incorporate weather data into a practical application. Moreover, weather data includes disproportionately impactful extreme weather events including, but not limited to, flooding, wildfires, and earthquakes.

Certain approaches focus on training neural networks to predict subsequent weather data. Other approaches focus on processing the weather data to determine extreme weather events. Some approaches focus on the use of weather data in automated driving where various sensors provide real time feedback.

SUMMARY

Neural networks which incorporate weather data and provide more accurate, less computationally demanding, and faster predictions of environmental event (e.g., weather) based consequences are desirable. An improved machine learning architecture is proposed that is directed to receive different time-series data sets relating to environmental conditions as well as a target variable for prediction and to transform the time-series data sets for training a plurality of different machine learning models. The trained machine learning models can be utilized to probe various configurations of environmental conditions, and in some embodiments, conduct first and second order co-efficient of variation determinations to generate one or more data values representative of environmental condition sensitivity metrics. The trained models are utilized to generate forecast predictions in view of predicted or scenario-based future environmental conditions. Output data sets include, for example, a target variable forecast for given environmental conditions, quantified sensitivity to various types of environmental conditions, among others.

The quantified sensitivity can be captured in terms of the first and second order co-efficient of variation determinations. The output data sets are utilized in some embodiments to generate interactive dashboards and visualizations having interactive visual elements that are controllable by a user to modify various variables and to render changes in predicted or forecasted values. For example, the system can be utilized to visually render changes when a temperature variable is changed using a controlled slider, for example.

The input time series data can be prepared by conducting periodic discrete time encoding, where, for example, there can be extracted a number of major features (e.g., 5) from each date-time indicating whether that specific date is a weekday, weekend, holiday, the week of month and a specific holiday important for specific events.

The time-series data sets may be utilized both in raw time-series form and also in a transformed de-trended form where periodicity is removed from the input data sets. De-trending is utilized to remove certain trend information from the data sets so that subtrends are more readily extracted.

Periodicity, for example, can include influence from daily fluctuations or monthly fluctuations. The trained models can include a plurality of models, and in an embodiment, three different models (Models A, B, and C) are proposed that are adapted and trained differently. Model A can be trained using the raw time-series data, while Models B and C can be trained using the de-trended data, with Model B adapted for a first environmental condition (e.g., weather), and Model C adapted for a second environmental condition (e.g., climate). The models can include neural network architectures, and in some embodiments, parallel decision tree architectures are utilized for establishing the models as data model architectures using interconnected computational objects.

The first environmental condition may have a first periodic/cyclical nature (e.g., fluctuates daily) and the second environmental condition may have a second periodic/cyclical nature (e.g., fluctuates monthly). The three models can be separately instantiated and their results can be aggregated to generate the output data set. Models B and C generate quantified sensitivity metrics for the corresponding environmental conditions (e.g., weather and climate). The models are neural networks having interconnected computing nodes having adjustable weights or filters which are refined over time through a series of training iterations adapted to optimize a loss function. The three models interoperate with one another to generate an aggregated result that is a forecast for a target variable at a point in time given certain environmental characteristics (e.g., weather or climate) predicted for that point in time, or utilized in a scenario to be modelled.

As described herein, Models B and C that interoperate with the de-trended data during training are also utilized to maintain sensitivity metrics based on a first co-efficient of variation and a second co-efficient of variation, which can be encapsulated together in an output data structure for the uses of rendering a dynamic visual dashboard for downstream analytics. The first co-efficient of variation and a second co-efficient of variation can be utilized to control specific aspects of the rendering, including automatically prioritizing which variables are to be adjustable in the dynamic visual dashboard, and determining how many variables are adjustable. This is particularly useful in situations where there are a large number of possible variables.

The output data set can be established for each of the estimated environmental scenarios under analysis using a combination of at least the first forecast future-state target variable, and the quantified sensitivity metric (e.g., weather and climate). The embodiments are not limited only to weather and climate data, but alternate embodiments can be directed to other types of external periodic data, such as wind directions/magnitudes, interest rate changes due to government policy changes, among others. The target variable being forecasted can include, for example, transaction data, prices, among others. In a more specific example, a set of historical transaction data can be input, and the machine learning architecture may be configured to generate forecasted or machine generated future transaction data for a number of different environmental condition scenarios.

Specific approaches are described in various embodiments relating to the use of co-efficient of variation, and in particular, first and second order co-efficients for assessing specific underlying environmental variables. A loss function is proposed to provide a "fair cost" approach that can be used at end of the training process to ascertain that the computational approach is estimating an objective correctly and accurately.

The technical approaches described herein may provide more accurate predictions that take into account weather effects on measured features. In particular, location-specific weather data can be coupled with location/time encoded data (e.g., transaction data) for provisioning into a machine learning data model architecture, such as a neural network. The location/time for the encoded data can be known and encapsulated in the data, or inferred (e.g., based on merchant type, point of sale device). The machine learning data model architecture, can include a mix of long-short term memory layers and cascaded dense layers. These layers can be provided through a set of interconnected computing nodes stored as data structures having stored weights and filters that are maintained to represent characteristics of interconnections between the computing nodes.

The weights and filters are adjusted through a training process where the individual weights and filters are iteratively tuned to optimize a loss function, such that over time, the interconnected computing nodes, when traversed in respect of a new input data set, can generate one or more output values that can be encapsulated as logits or predictions (e.g., after normalization using a softmax layer).

As described herein, geo-spatial weather data can be utilized to improve the technical performance of training the machine learning data model architecture (e.g., reducing a convergence time), which can be useful where there are limited computing resources available and/or the training only has a constrained period of time to improve the machine learning data model architecture to an acceptable level of prediction accuracy. The machine learning data model architecture can be maintained on a data storage as one or more neural networks, and a computer processor can be configured for training the machine learning data model architecture to establish a trained neural network. The computer processor can be incorporated as a computer system that can be maintained across one or more computer servers which may reside in a data center. Geo-spatial weather data, training data and/or input data can be obtained, for example, across a message bus in the form of data sets from coupled data storages or computer systems.

Effective training of neural networks based on geo-spatial weather data is a technical challenge that is faced by approaches to training a neural network to predict weather consequences.

This problem is exacerbated by geo-spatial weather data's variability in the time domain which makes training a neural network to make meaningful predictions based on the weather data difficult. For example, predictions based on weather data can lack geographic specificity, invalidating the predictions. For example, predictions which are overly reliant upon weather data from an incorrect time series can provide inaccurate guidance, invalidating the predictions. In some approaches, predictions incorrectly incorporate the impact of extreme weather events on a feature being modelled and fail to provide meaningful insight into weather effects on the feature.

In some embodiments, some of the approaches described herein propose a method of training a neural network based on a cost function comprising a normalization term, where the normalization term is based on a normalized value of at least one feature of a training data set over a first time series range. Training a neural network with this architecture may provide a more accurate prediction of weather consequences acting on features.

In some embodiments, some of the approaches described herein propose a neural network comprising transformer architecture to merge geospatial and temporal information with feature data to model the impact of weather as well as location on a specific feature. The proposed approaches may comprise a model comprising a deep learning architecture having a transformer architecture with an internal attention mechanism that takes into account what parts of the time series history is significant in regards to specific features. In example embodiments, the proposed neural network comprises at least one recurrent neural network element (e.g., an RNN).

Transformer architectures may be utilized for parallel processing (as opposed to RNNs, which may otherwise cause a bottleneck). Transformer architectures may utilize an attention mechanism in the architecture observing historical features or tokens for a certain context and a certain prediction task, emphasizing certain features or tokens more than others for the purpose of the prediction. The emphasized features or token are more prominent in respect of a contribution into the determination of a predicted value. In a classification context, this could mean picking in one class as opposed to another.

In a non-limiting example, a health care provider may have suppliers that are affected by weather events, and the amount of and nature of services being provided may fluctuate greatly according to extreme weather events. Accurate prediction of the relationship among these environmental forces and service demands is difficult to quantify. Training a neural network in accordance with the embodiments set out herein may quantify the macro and micro relationships among weather, extreme weather, climate and climate change and features in a geo-spatial and spatio-temporal context.

In some embodiments, the neural network is configured to determine a weather event consequence on the volume and value of transactions for businesses. According to some embodiments, for example, the neural network is configured to determine financial performance of businesses at a given time and location (i.e., on the time and location axes) based on weather data.

In some embodiments, predicting changes in weather events and the related consequences on a feature comprises the neural network architecture described herein adapted to determine the impact of weather events to financial transactions associated with businesses. The neural network architecture may be a neuro-spatial model configured to predict the impact of weather and climate change on businesses of various sizes. According to examine embodiments, the neural network is configured to receive input data comprising a certain location, business type, business characteristics, period of time, past transactions (both number and volume), and the weather features on that date at the given location, and predict the revenue projected on the specified date for the specific period of time for any known or new business.

In some embodiments, there is provided a computer-implemented method for a neural network having a plurality of neural network elements. The method comprises training a neural network based on a first data set stored in the memory, where the first data set represents labelled training data comprising a plurality of entries for a plurality of features. The neural network is trained based on a cost function comprising a normalization term based on a normalized value of at least one feature of the first data set over a first time series range. A second data set representing the trained neural network is stored.

In some embodiments, the plurality of neural network elements comprise at least one transformer element with an internal attention mechanism configured to sample the plurality of entries of the first data set for a second time series range.

In some embodiments, the plurality of neural network elements comprise at least one Long Short Term Memory (LSTM) element and at least one dense neural network architecture.

In some embodiments, the first data set entries are scaled prior to training the neural network.

In some embodiments, the first data set comprises a time series weather data set, a business type data set, and location data set, and a time series transaction data set. In some embodiments, for example, the business type data set is one hot encoded. In some embodiments, for example, the normalization term is based on an average daily transaction amount feature of the first data set.

In some embodiments, the method further comprises receiving an input data set comprising an input business type data set, an input desired times series data set, and an input location data set. The input data set is passed through the trained neural network to generate processed data comprising expected transaction data, and the processed data is stored.

In some embodiments, the first data set comprises a business identifier feature, and the first data set incorporates or adheres to a data proportion threshold for each unique business identifier entry.

In some embodiments, there is provided a system for training a neural network having a plurality of neural network elements. The system comprises a computer processor operating in conjunction with a computer memory where the computer processor is configured train a neural network based on a first data set stored in the computer memory, where the first data set represents labelled training data comprising a plurality of entries for a plurality of features. The neural network is trained based on a cost function comprising a normalization term based on a normalized value of at least one feature of the first data set over a first time series range. The computer processor stores a second data set representing the trained neural network in the computer memory.

In some embodiments, the plurality of neural network elements comprise at least one transformer element with an internal attention mechanism configured to sample the plurality of entries of the first data set for a second time series range.

In some embodiments, the plurality of neural network elements comprise at least one LSTM element and at least one dense neural network architecture.

In some embodiments, the first data set entries are scaled prior to training the neural network.

In some embodiments, the first data set comprises a time series weather data set, a business type data set, and location data set, and a time series transaction data set. In some embodiments, for example, the business type data set is one hot encoded. In some embodiments, for example, the normalization term is based on an average daily transaction amount feature of the first data set.

In some embodiments, for example, the system further comprises the computer processor configured to receive an input data set comprising an input business type data set, an input desired times series data set, and an input location data set, and pass the input data through the trained neural network to generate processed data. The processed data comprises expected transaction data, and the computer processor is configured to store processed data in the computer memory.

In some embodiments, for example, the first data set comprises a business identifier feature, and the first data set incorporates or adheres to a data proportion threshold for each unique business identifier entry.

In accordance with another aspect, there is provided a non-transitory, computer readable medium or media having stored thereon data defining a trained neural network provided by performing the methods set out above.

Many further features and combinations thereof concerning embodiments described herein are contemplated.

DESCRIPTION OF THE FIGURES

In the figures, embodiments are illustrated by way of example. It is to be expressly understood that the description and figures are only for the purpose of illustration and as an aid to understanding.

FIG. 12 is an example set of data outputs, according to some embodiments.

DETAILED DESCRIPTION

Figure 1A:
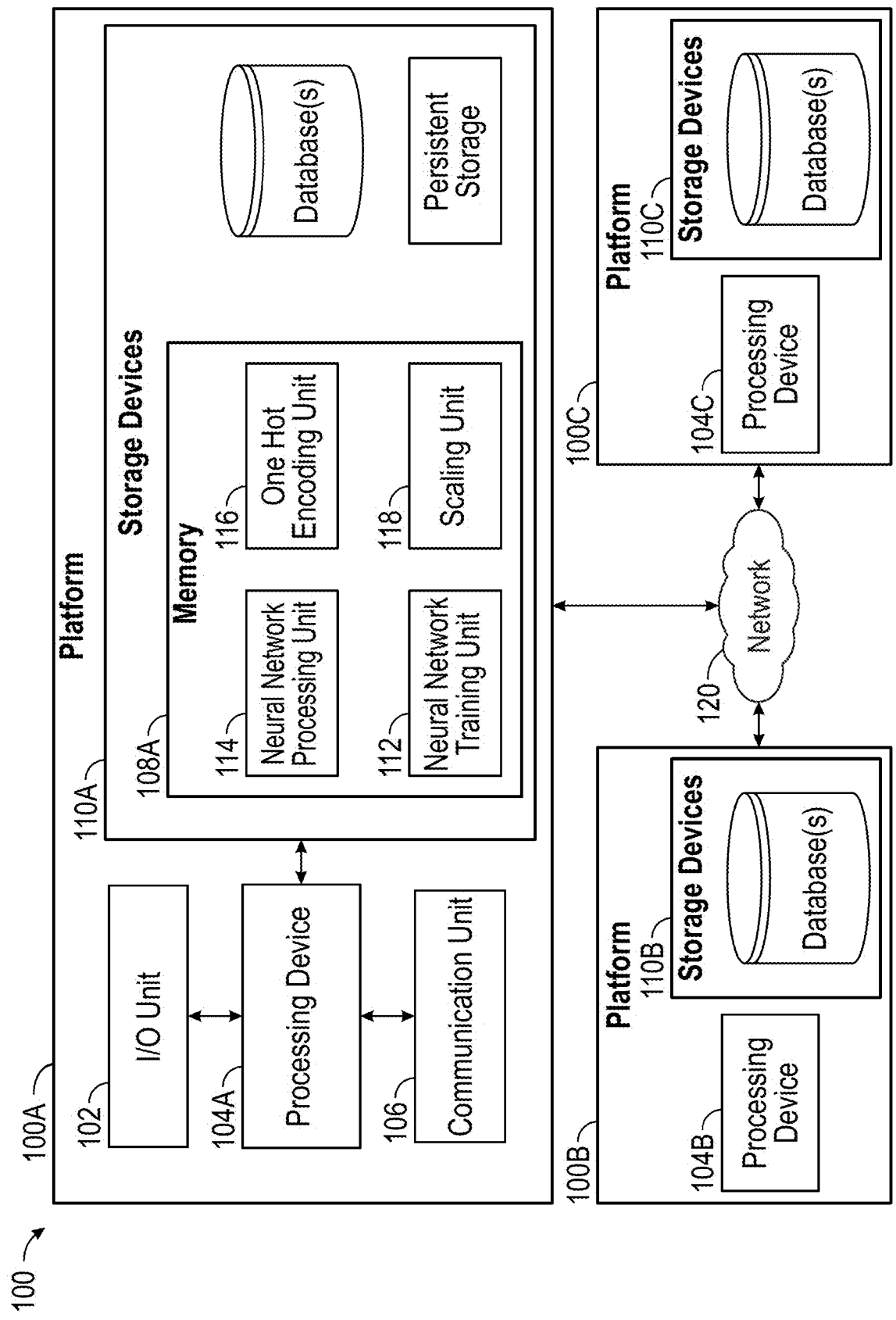
FIG. 1A is a block schematic of an example system, according to some embodiments.

Systems and methods adapted for training neural networks are described herein in various embodiments. As described further, training machine neural networks based on a cost function comprising a normalization term, the normalization term based on a normalized value of at least one feature of the first data set over a first time series range includes challenging technical problems as the potential means of accounting for weather data geo-spatial variability and impact on training data features.

The proposed normalized cost function, in example embodiments, can balance the prediction accuracy of the trained neural network amongst different features of the first data set. Configuring a neural network with an appropriate cost function is not trivial. Cost functions have to balance prediction accuracy, training time, and data characteristics, among other things. Selecting and deriving a correct cost function is a difficult technical endeavour.

In example embodiments, some of the approaches described herein propose a neural network comprising transformer architecture to merge geospatial and temporal information with feature data to model the impact of weather as well as location on a specific feature. The proposed approaches may comprise a model comprising a deep learning architecture having a transformer architecture with an internal attention mechanism that takes into account what parts of the time series history is significant for a certain decision. In example embodiments, the proposed neural network comprises at least one a recurrent neural network element.

According to example embodiments, the feature being normalized is an average daily transaction amount feature. In some embodiments, for example, the trained neural network can estimate the impact of weather events on various businesses of various sizes. In some embodiments, for example, the proposed neural network can estimate the impact of weather events for every type of business.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Embodiments herein are implemented using a combination of electronic or computer hardware and/or software, such as processors, circuit boards, circuits, data storage devices, and memory. The embodiments described may comprise various types of neural network architectures and topologies, such as data architectures adapted for supervised learning, reinforcement learning, among others.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, and composition of matter, means, methods and steps described in the specification.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

As can be understood, the examples described herein and illustrated are intended to be exemplary only.

FIG. 1A is a schematic diagram showing aspects of an example computing system according to some embodiments. The computing system 100 can implement aspects of the processes described herein. In some embodiments, the computing system can provide a dynamic resource environment. In some embodiments, the dynamic resource environment can be a cloud platform or a local platform on which training data is stored and neural networks are be trained.

The computing system 100 may comprise a first platform 100A, a second platform 100B, and a third platform 100C. Each platform can include an input/output unit 102A, shown only in the first platform 100A (hereinafter referred to as the I/O Unit in the singular), a processor 104A, 104B, and 104C (hereinafter referred to as the processor in the singular) respectively, communication unit 106 shown only in the first platform (hereinafter referred to as the communication unit in the singular), and storage devices 110A, 110B, 110C, (hereinafter referred to as the data storage devices in the singular) respectively. The I/O Unit can enable the each computing system within computing system 100 to interconnect with one or more input devices, such as a keyboard, mouse, camera, touch screen and a microphone, and/or with one or more output devices such as a display screen and a speaker.

Memories, shown only in the first platform 100A as memory 108A, and referred to herein in the plural, may include a suitable combination of computer memory that is located either internally or externally such as, for example, random-access memory (RAM), read-only memory (ROM), CD-ROM, electro-optical memory, magneto-optical memory, erasable programmable read-only memory (EPROM), and electrically-erasable programmable read-only memory (EEPROM), ferroelectric RAM (FRAM).

Storage devices may be configured to store information associated with or created by the components in memories and may also include machine executable instructions. The storage devices include a storage which may involve various types of storage technologies, such as solid state drives, hard disk drives, flash memory, and may be stored in various formats, such as relational databases, non-relational databases, flat files, spreadsheets, extended markup files, etc.

The communication units can enable each platform with computing system 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Each platform in the computing system 100 can be operable to register and authenticate users (using a login, unique identifier, and password for example) prior to providing access to applications, a local network, and network resources, other networks and network security devices. The computing system 100 may serve multiple users which may require access to sensitive data.

In example embodiments, the first platform 100A represents a cloud computing platform, the second platform 100B represents a weather data repository, and the third platform 100C represents a merchant system.

In example embodiments, the storage device 110A comprises a neural network data set and a first data set. The neural network data set may comprise data representing a defined number of the plurality of neural network elements, including but not limited to their placement relative to one another. For example, a first neural network element may be configured to, upon activation, provide an output to a second neural network element. The first data set may comprise a historical geo-spatial weather data set, a business type data set, and a historical transaction data set. In example embodiments, the neural network set and the first data set are a single data set, and hereinafter referred to as the "first data set."

In example embodiments, the historical geo-spatial weather data set may comprise entries representing the following weather features: accumulated precipitation data, snow fall data at various depths, temperature data, wind speed data, and so forth. The historical geo-spatial weather data includes the location at which the weather event or weather characteristic was measured. In example embodiments, any measured weather characteristic can be included in the historical geo-spatial weather data set as a feature, with corresponding entries representing the measured value of that feature at a particular time.

In example embodiments, the business type data set comprises entries representing one of the following business type features: accounting, administrative area level 1, administrative area level 2, administrative area level 3, airport, amusement park, aquarium, bakery, bank, bar, beauty salon, bicycle store, book store, bowling alley, bus station, cafe, campground, car dealer, car rental car wash, casino, cemetery, church, city hall, clothing store, convenience store, courthouse, dentist, department store, doctor, electronics store, embassy, establishment, finance, fire station, florist, food, funeral home, furniture store, gas station, general grocery or supermarket, gym, hair care, hardware store, health, Hindu temple, home goods store, hospital, insurance agency, jewelry store, laundry, lawyer, library, light rail station, liquor store, local government office, locality, locksmith, lodging, meal takeaway, mosque, movie rental, movie theater, moving company, museum, natural feature, neighborhood, night club, painter, pet store, pharmacy, physiotherapist, place of worship, plumber, point of interest, police, political, post office, postal code, premise, real estate agency, restaurant, roofing contractor, route, RV (recreational Vehicle) park, school, shoe store, shopping mall, spa, stadium, street address, sublocality, sublocality level 1, subpremise, subway station, supermarket, synagogue, taxi stand, train station, travel agency, university, veterinary care, zoo. In example embodiments, the business type data set can comprise a feature for any business type for which there is corresponding data in the historical transaction data set.

The business type data may be one hot encoded by the one hot encoding unit 116. For example, a multidimensional vector with each dimension representing a different business type, and a binary value represented in each dimension as to whether that business unit type is a feature of a particular entry, may be encoded.

In example embodiments, the historical transaction data set comprises features representing the average number of visitors (AVG_CLNT) for the particular business and transaction amount (AVG_AMT) for the particular business, and entries for those features at a particular time. In example embodiments, the historical transaction data set comprises features representing individual transactions at a merchant. In some embodiments, for example, the historical transaction data set comprises entries in a transaction feature for every transaction data received directly from the third platform 100C operating as a merchant terminal.

The historical transaction data set and the historical geo-spatial weather data set comprise a plurality of entries (e.g., rows) for a plurality of features (e.g., columns within data sets), including features which are derived or intended to interact with existing features. For example, the aforementioned data sets may comprise a feature that lists whether other features within the data sets are related to a particular date of transaction, for example, (i.e., Boxing day, Christmas day), to a particular day of the week (i.e., Mon, Tue, Wed, Thu, Fri, Sat, Sun), to a particular month (i.e., Month January 2019, Month August 2018, Month December 2018), to a particular week of a month (i.e., Week of Month 1, Week of Month 2), and to a particular year (i.e., Year 2018, Year 2019).

In example embodiments, at least some of the first data set is stored on a storage device remote to the first platform 100A. For example, the first data set may be stored on storage device 110B, or any other platform. For example, the historical geo-spatial weather data set may be stored on the second platform 100B and recalled in parts to the first platform to train the neural network.

In example embodiments, the first data set is updated such that neural networks are trained on up to date data. For example, new historical geo-spatial weather data may be obtained (e.g., push or pulled) from a weather data repository platform 100B continuously or periodically.

In some embodiments, each platform within the computing system 100 can include one or more processors at one or more physical and/or logical computing machines. In some embodiments, each platform within the computing system 100 may comprise a single computer/machine/server with one or more active environments. In some embodiments, each system within the computing system 100 may include multiple processors spread across multiple physical machines and/or network locations (e.g., in a distributed computing environment). The term processor should be understood to include any of these embodiments whether described in singular or plural form. The processors can execute instructions in memories to implement aspects of processes described herein. The processor can be, for example, a microprocessor or microcontroller, a digital signal processing (DSP) processor, an integrated circuit, a field programmable gate array (FPGA), a reconfigurable processor, or combinations thereof. Hereinafter actions, operations, or processes attributed to the any platform are understood to be performed by the respective processors.

In example embodiments, the processor 104A can execute instructions in memory A to configure a neural network training unit 112, a neural network processing unit 114, a scaling unit 118, and a one hot encoding unit 116, and other functions described herein.

The neural network training unit 112 is configured to train neural networks based on the first and first data sets stored in memory 108A.

Figure 1B:
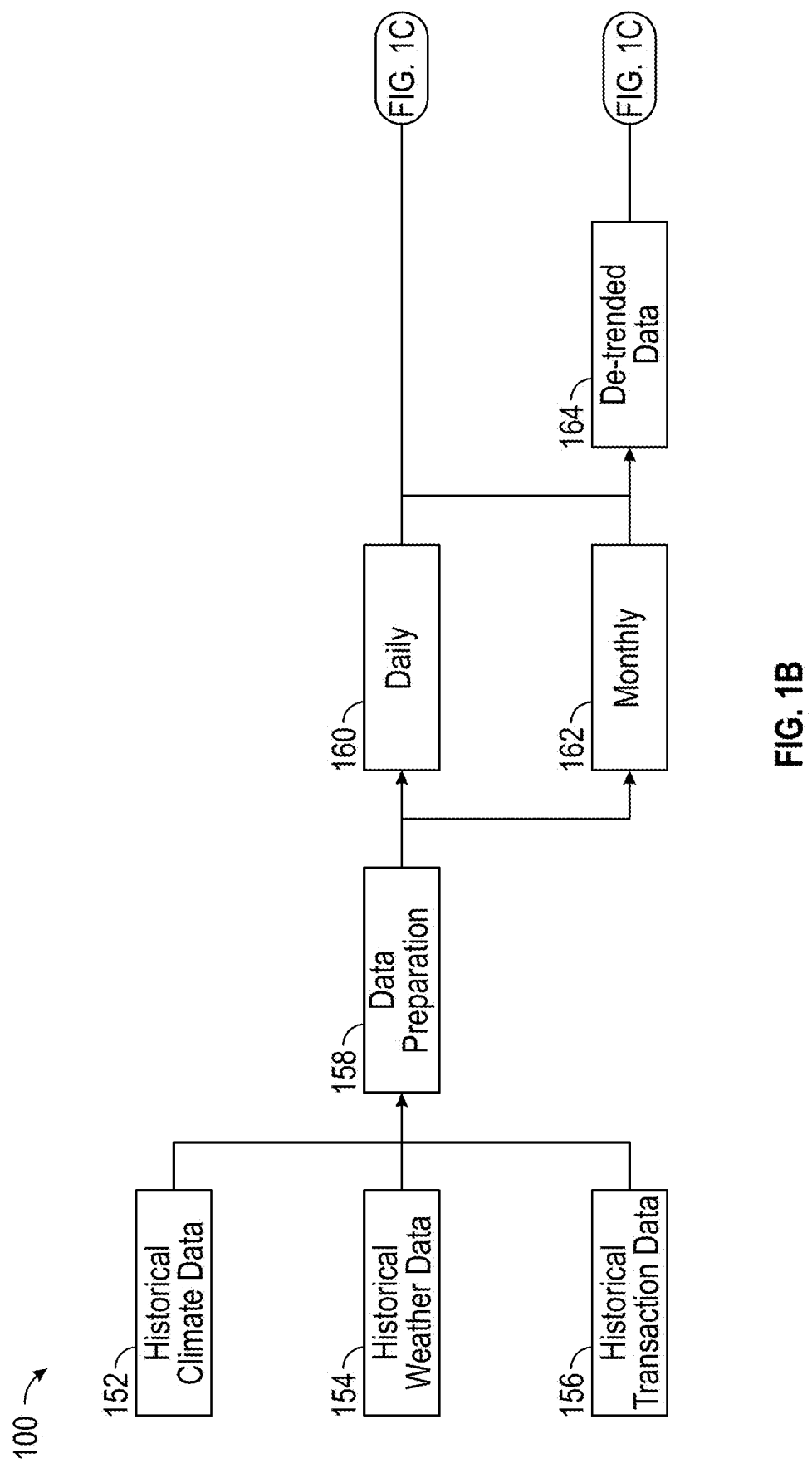
FIG. 1B and FIG. 1C are a more detailed block schematic diagram of the example system, illustrating different models operating in concert with one another, according to some embodiments.

FIG. 1B is a more detailed block schematic diagram of the example system 100, illustrating different models operating in concert with one another, according to some embodiments. FIG. 1B continues to the block schematic diagram shown in FIG. 1C.

The system shown is a more detailed perspective of an example implementation of the system of FIG. 1A.

In particular, an improved machine learning architecture is proposed that is directed to receive different time-series data sets relating to environmental conditions as well as a target variable for prediction and to transform the time-series data sets for training a plurality of different machine learning models.

The trained machine learning models can be utilized to probe various configurations of environmental conditions, and in some embodiments, conduct first and second order co-efficient of variation determinations to generate one or more data values representative of environmental condition sensitivity metrics.

The trained models are then utilized to generate forecast predictions in view of predicted or scenario-based future environmental conditions. Output data sets include, for example, a target variable forecast for given environmental conditions, quantified sensitivity to various types of environmental conditions, among others.

FIG. 1B illustrates the input components of the system, and for this example, climate data 152 and weather data 154 are utilized along with a target data distribution, historical transaction data 156.

Figure 6:
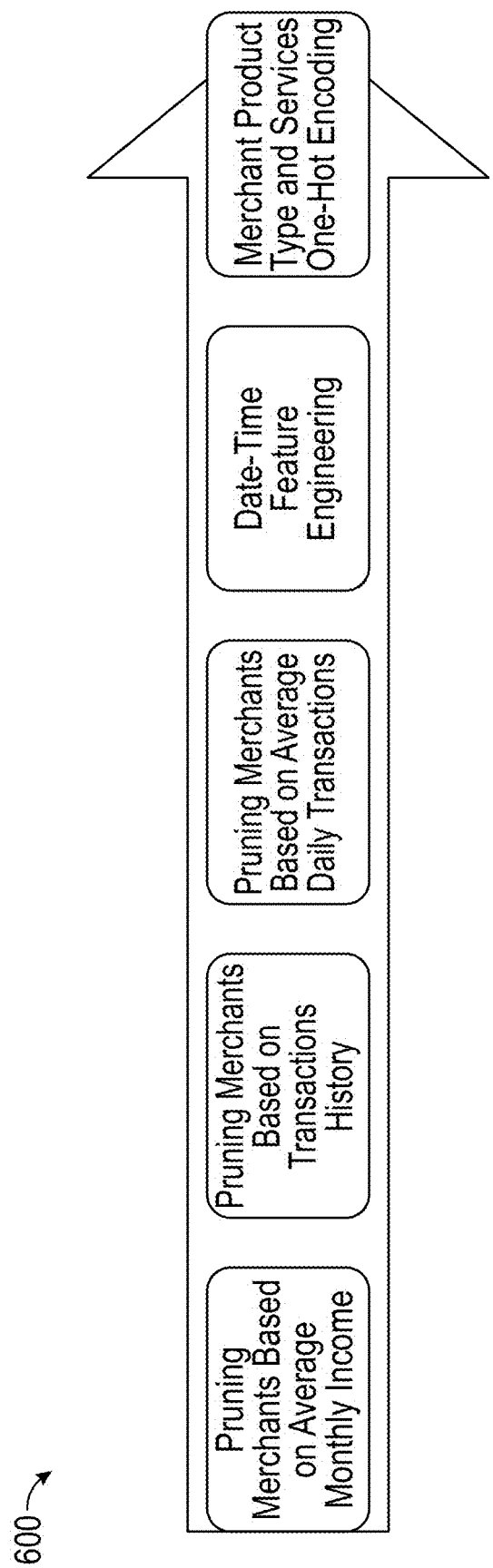
FIG. 6 is an example data pre-processing method diagram, according to some embodiments.

Example pre-processing steps are shown at process flow 600 in FIG. 6. Merchant data can be pre-processed to apply date-time feature engineering, for example, to create the encoded data sets that are then provided into the proposed machine learning system. Pruning may be utilized optionally during the refinement of the system performance for particular sectors or subsets of targets (e.g., merchants). The pruning, in an embodiment, may include an automatic modification of a set through, for example, variability in prediction, a size of transactions history, an average number of daily transactions, among others. The pruning features can be utilized to modify a focus of the system.

With respect to date-time feature engineering and merchant product type and services one-hot encoding, values are encoded onto the data set. As described further below, a proposed approach is adapted in FIG. 8B that avoids certain issues related to naïve approaches that yield sparse vectors. As noted in the improved approach in FIG. 8B, cyclic information is encoded directly to have signals related to weekdays, holidays, weeks of a month, specific holidays, etc. Having this information directly encoded improves model performance as the system no longer needs to extract this from the encoding. This type of encoding unlocks the ability to conduct de-trending (e.g., the system will be able to distinguish a Monday from a Tuesday) and to simulate feature conditions. The encoding allows the encoding of periodic patterns in a discrete manner. It allows improved downstream results through using discretely encoded input feature vector as opposed to a continuously encoded input feature vector (e.g., sinusoidal waveforms).

The input time series data shown as 152, 154, and 156 can be prepared at 158 by conducting periodic discrete time encoding, where, for example, there can be extracted a number of major features (e.g., 5) from each date-time indicating whether that specific date is a weekday, weekend, holiday, the week of month and a specific holiday important for specific events. In some embodiments, an encoded version is received directly and the step of encoding can be omitted. The encoding is utilized to track periodic aspects of the data set for later de-trending.

The data can be prepared for different periods of time, such as daily in 160, and monthly in 162, to establish a de-trended data set 164.

Accordingly, the time-series data sets output from 160 and 162 can be utilized both in raw time-series form and also in a transformed de-trended form from 164 where periodicity is removed from the input data sets. Periodicity, for example, can include influence from daily fluctuations or monthly fluctuations.

Figure 7:
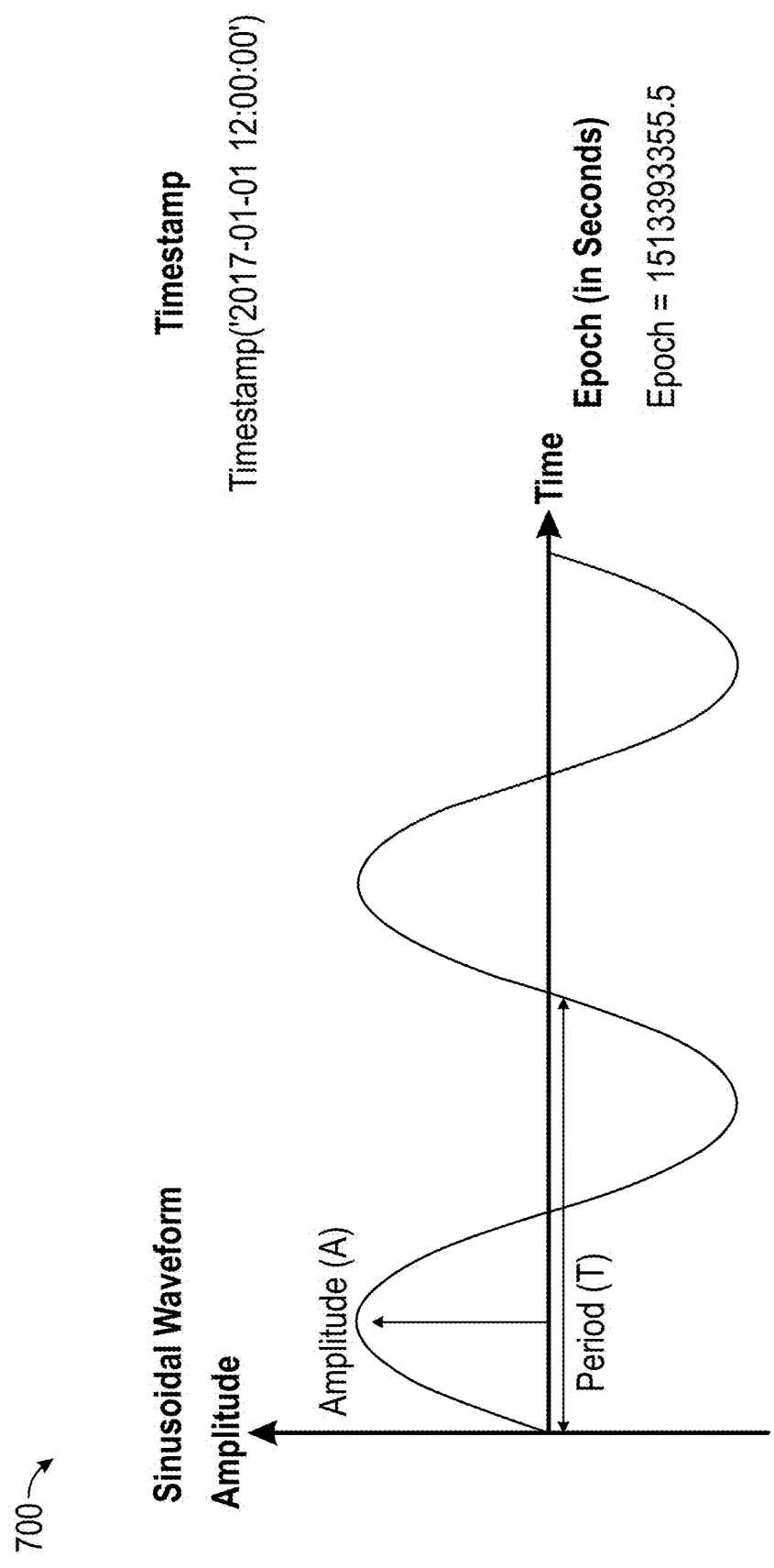
FIG. 7 is a diagram showing periodic discrete time-encoding, according to some embodiments.

As shown in diagram 700 in FIG. 7, de-trending of data may include extracting features of analogous waveform transformations, such that cyclical variations at a number of frequencies are accounted for. In this example, timestamps are utilized to track amplitude and periods of changes in the data set, and these can be adjusted for to establish the de-trended data set 164.

Different approaches can be utilized for tracking time and timestamps, such as Epochs (in seconds), but these encoding approaches do not have periodic aspects of time/cyclic nature of features encoded into it (e.g., day and night, day of week, what year it is). Without having these features encoded, the model would have to figure out these aspects, impacting performance and/or accuracy.

For discrete classification or regression approaches, including any types of decision trees, a discrete encoding is more fitting and more suitable. Those approaches often make decision branch splits using an entropy based measure called "information gain", and that is a discrete operation. In that operation, it makes it quite arbitrary if it is provided a continuous stream of data, as it needs to make arbitrary cuts relative to the value, which is not desirable or optimal.

Time can be a very important factor in predicting events, such as purchases made at a merchant's location. This can be in the shape of:

1. Timestamps=Timestamp('2017-01-01 12:00:00')
2. Epoch=1513393355.5
3. Sinusoidal Waveform: as shown in the image above The first two are not much informative as a data structure. The information is provided in the form of a string and a scalar, respectively, and do not encode the periodic and cyclic patterns hidden in how the time goes by, including days, weeks, months, and important event such as holidays. These pieces of information can be critical to an overwhelming majority of time-series models.

A sinusoidal waveform does encode the periodic nature of an event but it is not a discrete data structure. It is continuous in nature which is not utmost compatible with a proposed tree-based architecture. In some embodiments described herein, a light-weight decision tree approach is utilized to benefit from its computational efficiency enabling edge and low-compute device deployment such as cellphones or Point Of Sale (POS) machines. This is critical in preserving merchants' and costumers' privacy.

Experimentally, a proposed embodiment of the tree-based architecture was able to be run dozens of gigabytes of data efficiently on relatively small computational resources (for example, 4 GB RAM and 4 to 8 Cores).

Figure 8A:
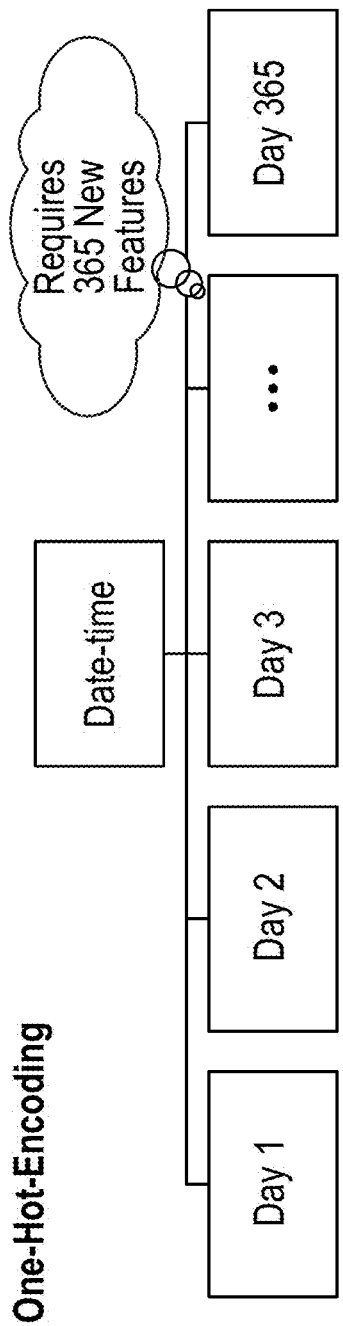
FIG. 8A and FIG. 8B are diagrams comparing raw one-hot-encoding and date-time features extraction, according to some embodiments.
Figure 8B:
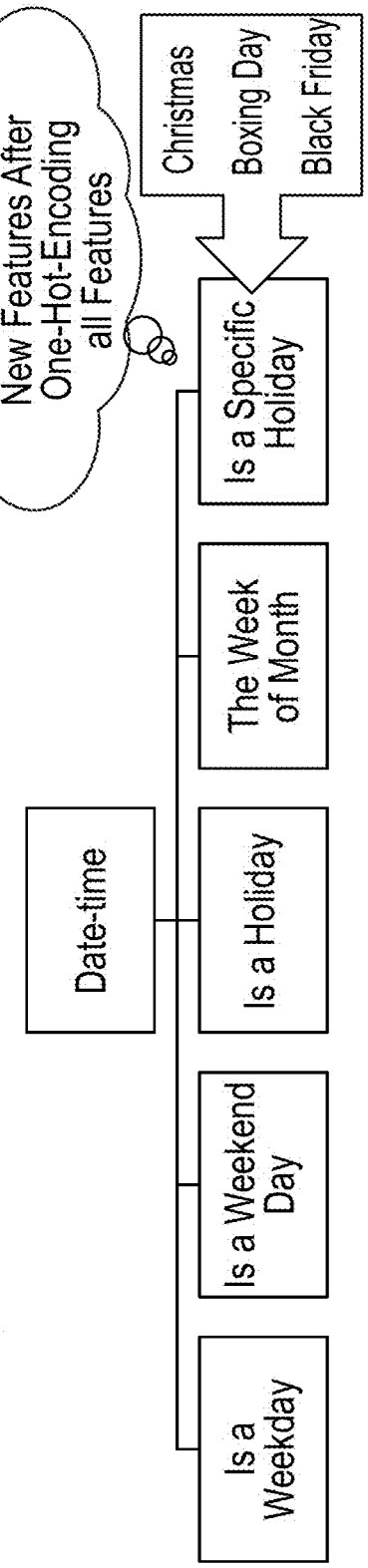

FIG. 8A and FIG. 8B are example diagrams 800 showing a date-time features extraction, according to some embodiments. A reduced set of features is provided in the proposed approach shown on FIG. 8B, relative to a naïve approach where every day of the year is modelled as a feature.

Tree-based architectures are discrete predictive methods, and a challenge was that a discrete representation of time to encode periodic and cyclic patterns was needed for 590 experimentation. In this example, a blindly applied one-hot-encoding mechanism of FIG. 8A will result in a feature vector of size 365 which as well does not preserve the periodic patterns in the data.

A new encoding data structure is proposed in FIG. 8B to address these shortcomings yet preserving the discrete format of the encoding.

Instead of applying raw date-time one-hot-encoding approach yielding 365 features, in this example approach for periodic discrete time encoding, the system was configured to extract 5 major features from each date-time indicating whether that specific date is a weekday, weekend, holiday, the week of month and a specific holiday important for specific events (here transactions taken place at a merchant's location).

Figure 1C:
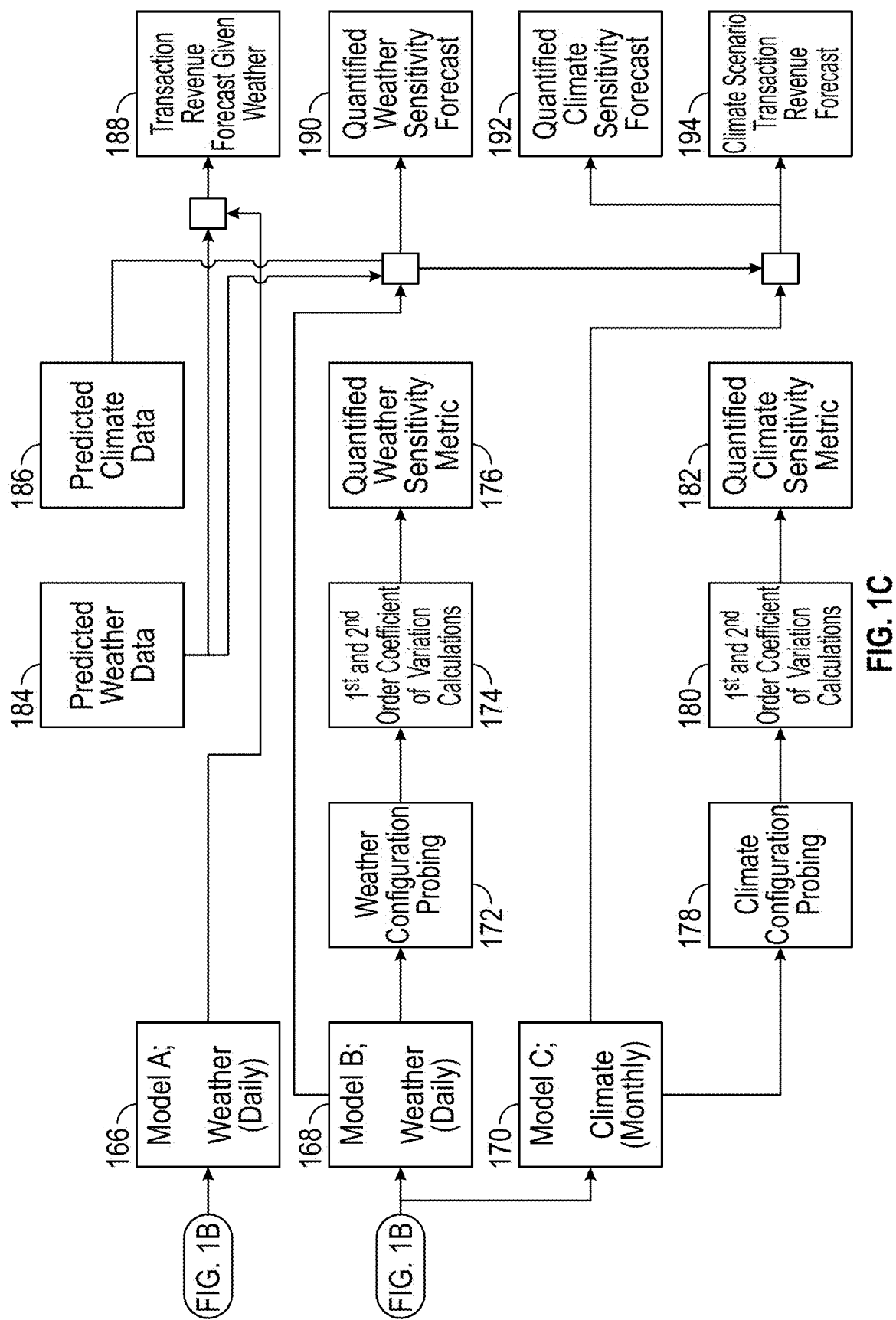

Continuing to FIG. 1C, the data and the de-trended data are provided into a set of models for training. While in this example, three different models are shown, other approaches are possible. These models can be iteratively trained using a loss function (e.g., minimizing losses) such that interconnections between data object representations are refined over a period of time.

Accordingly, the trained models can include a plurality of models, and in an embodiment, three different models (Models A 166, B 168, and C 170) are proposed that are adapted and trained differently. Model A 166 can be trained using the raw time-series data, while Models B 168 and C 170 can be trained using the de-trended data 164, with Model B 168 adapted for a first environmental condition (e.g., weather/daily), and Model C 170 adapted for a second environmental condition (e.g., climate/monthly). The models can include neural network architectures, and in some embodiments, parallel decision tree architectures are utilized for establishing the models as data model architectures using interconnected computational objects.

In some embodiments, Models A, B, and C have a same architecture and trained differently. In another embodiment, Model A has a different model architecture than Models B and C. Model A can use any type of architecture (e.g., fully auto-regressive, partially auto-regressive). A fully auto-regressive approach may yield an undesirable error propagation (e.g., if determining D4, errors in determining D1 may impact D2, and so on). In the partially auto-regressive architecture D4 would be determined independently of D1, D2, and D3.

Error propagation can occur with time-series data as each successive data may lead to more error. On the other hand, in some embodiments, Models B and C are implemented using model architectures (e.g., partially auto-regressive) that do not propagate error from $P_t$ to $P_{t+1}$, P being the predicted value.

Configuration probing steps 172 and 178 can be utilized to assess a sensitivity to the corresponding environmental features (in this case, weather and climate).

The first environmental condition may have a first periodic/cyclical nature (e.g., fluctuates daily) and the second environmental condition may have a second periodic/cyclical nature (e.g., fluctuates monthly). The three models 166, 168, and 170 can be separately instantiated and their results can be aggregated to generate the output data set. Models B 168 and C 170 are configured to generate quantified sensitivity metrics for the corresponding environmental conditions (e.g., weather and climate).

Figure 9:
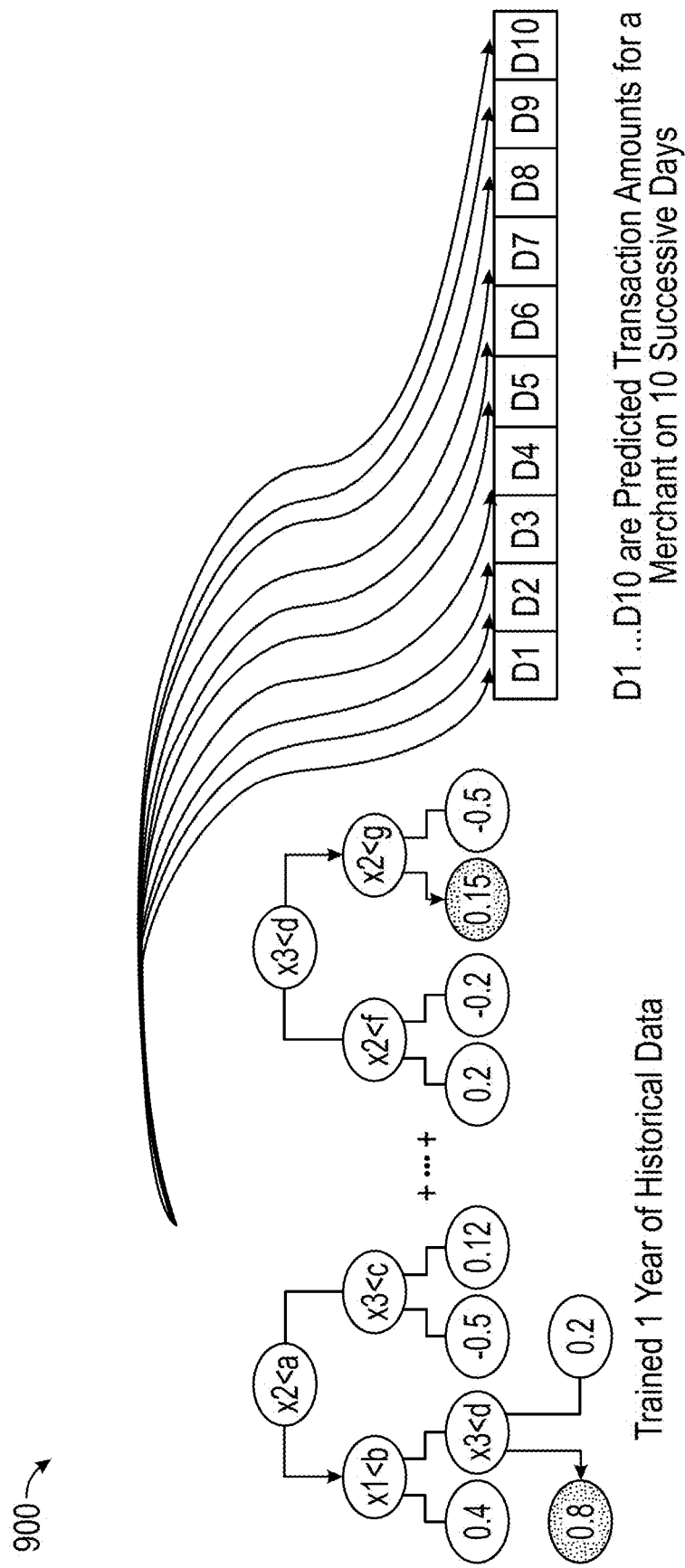
FIG. 9 is a diagram showing an example tree based CABI architecture during inference, according to some embodiments.

FIG. 9 illustrates an example approach 900 for an architecture utilized for inference. A parallel decision tree architecture is shown adapted for predicting multiple days in the future simultaneously, despite the nature of the prediction which is sequential and time-series. Consequently, each day can be predicted independently of the immediate days before which highly speeds up the prediction process and the architecture is still able to keep relevant time-series and sequential information among the days in the future from its training regime. This is useful since in the prediction of future events e.g., 10 days in the future as illustrated in the diagram, one may not have access to the block of immediately preceding days for a certain target date. In addition to the architecture, this is possible partially due to the discrete time-encoding method the proposed approach that works highly aligned with a tree-based predictive component which is designed to work well with discrete data.

First and second order coefficient of variation determinations 174 and 180 are utilized to establish the sensitivity metrics 176 and 182.

The models 168 and 170 are agnostic to day of the week, month, etc. as the input data has been de-trended. The models 168 and 170 receive different weather and climate configurations (e.g., temperature and precipitation). For example, high temperature, low precipitation, or vice versa. The models are utilized to predict a transaction amount for a particular configuration of external conditions as an output data set. If in two dimensions, a plane is being created (e.g., a surface) that describes the individual target company's sensitivity or response to weather.

A challenge to conduct fair comparisons of environmental sensitivity between transactions of companies of different characteristics (e.g., sizes, number of transactions, amount of transactions) is that they are not directly comparable. A co-efficient of variation approach is described below to normalize such that comparisons may be drawn between companies having different characteristics.

Models A, B, and C are trained across inputs from companies having different sizes, and normalization is required to ensure proper comparisons across the training set (e.g., trained across all merchants). The models are trained to provide a data summary to be prompted to attain the co-efficient of variation metrics, which can then be utilized to determine the sensitivity scores. A co-efficient of variation is generated for each configuration, and these can be determined for specific environmental variables (e.g., sensitivity to precipitation while holding other variables constant). For example, for the weather, there may be a number of variables (e.g., insolation, temperature, wind speed).

The quantified sensitivity metrics 176 and 182 are generated from the first and second order co-efficient of variations 174 and 180. The probing of the trained model is done at steps 172 and 178. The trained models can be envisaged as stacks of terrain, and the probing is utilized to establish the first and second order co-efficient of variations to effectively probe and determine characteristics of the "terrain". Probing, for example, can include the using of test values on and around various coordinates to identify rates of change, among others.

First order coefficient of variation (COV) is the standard deviation divided by the mean, and this indicates the variability in predictions and allows the system to compare among companies.

Second order coefficient of variation (SCOV) is the standard deviation of standard deviations divided by the mean of standard deviations. This indicates the variability of standard deviations. The SCOV can be used to identify companies where there is an aspect of an environmental feature that is particularly significant in impacting the predicted output.

The difference between the first order and the second order is that the second order indicates that there is much variability in the standard deviations, so that one of the features that go into weather is having a larger impact on the company (e.g., not everything equally, but perhaps just one feature is causing it—the company can be very sensitive to temperature, but not wind or precipitation if there is a high SCOV).

The SCOV is useful in situations where only certain specific features of the environmental conditions (e.g., just temperature as opposed to rainfall for weather) have a greatest impact (e.g., where there is one major contributor as opposed to sensitivity across all underlying variables). The COV and the SCOV can be conducted on each feature combinations (e.g., feature pairs) as well as for the features in aggregation. Each of these outputs can be considered a sensitivity metric 176 or 182, which can be used, for example, as outputs to aid a portfolio manager to de-risk a portfolio.

An example of how these can be used: If the system determines that a company has a large COV, the system would be able to identify that the model considers that the company to be highly sensitive to weather variables. If the system also determines that the SCOV is large for that company, it means that there is a specific variable (or configuration) that is causing the high sensitivity. If the system then observes the SCOV for each variable, it may be determined that the SCOV for temperature is high while the SCOV for the other variables are low. This means that temperature is the main contributor to the high weather sensitivity. Again, the estimates can be compared among companies.

In some embodiments, the output dashboard generates visualizations where the COV and SCOV are utilized as sliders or other types of visual interactive elements, such as knobs, for their associated variables and/or variable pairs. The COV and/or SCOV can then be utilized to identify which variables (e.g., of a set of variables underlying weather and/or climate) that should be associated with the sliders or knobs, as these factors are identified as the most contributing to the overall predicted value (and thus are of most interest to be changed).

An example determination of the COV and SCOV are provided below. Multiple determinations are possible for different combinations of variables.

COVA=Standard deviation of three predictions divided by the mean of three predictions for each configuration.

A new output feature (e.g., sensitivity metric) is created for a particular configuration of weather, as well as a mean. The new output feature can be established for both the standard deviation and the mean and COVAs for each configuration (e.g., configuration 1=S×$T_{min}$ (e.g., minimum temperature)×$W_{min}$ (minimum wind speed), config 2=S (snow/precipitation)×$T_{min}$×$W_{max}$, . . . ). The first configuration could include snow/precipitation as a changing variable, with maximum/minimum temperature/wind speed in various permutations. In this example, there will be a total of 12 COVAs (4 configurations per variable×3 variables).

COVB=Standard deviation of all 12 predictions/mean of all 12 predictions for each variable (e.g., variable=all predictions for all configurations of S).

Similarly, the standard deviation and mean and COVBs can be established as new output features. There will be a total of 3 COVBs (COVB from all predictions for 1 variable×3 variables).

COVC=Standard deviation of all 36 predictions/mean of all 36 predictions for weather (i.e., all variables together).

Similarly, the standard deviation and mean and can be established as new output features. There will be a total of 1 COVC because in this example, COVC is for all of the aggregated weather variables.

For the second order co-efficient of variation, the standard deviation of the standard deviations can be utilized. For example, SCOVA=standard deviation of the 4 standard deviations of each configuration/mean standard deviation of the 4 standard deviations of each configuration.

All three parameters can be established as output features. There will be a total of 3 SCOVAs (one for each variable) SCOVB=standard deviation of the 3 standard deviations of each variable/mean standard deviation of the 3 standard deviations of each variable.

All three parameters can be established as output features. There will be a total of 1 SCOVB (e.g., for the variables in aggregation).

Figure 10:
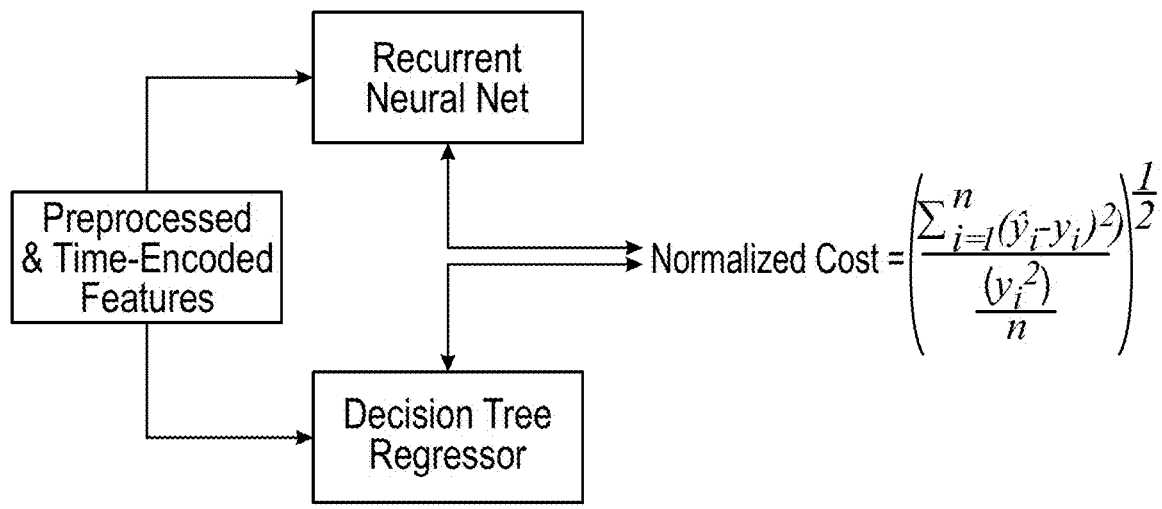
FIG. 10 is an example fair cost function that can be utilized for the machine learning architecture, according to some embodiments.

FIG. 10 illustrates an example cost function 1000 that can be used at the end of the training approach to ascertain that the system estimating its objective correctly and accurately. In certain approaches, cost functions focus on minimizing the overall cost of an optimization algorithm. This blind approach will have a side-effect resulting in biases towards more prominent samples within a dataset.

In FIG. 10, during training, the model makes a prediction and compares against the actual number, and a normalized amount is established by company size so that when the model observes the error, it contextualizes it for the company size to improve training over a heterogeneous training set where there are different company sizes or characteristics. The normalized cost function is utilized in the architecture to address the discrepancies in the input data set, enabling training of a single model of a variety of heterogeneous types and sizes of inputs (e.g., merchants). y in the function shown in FIG. 10 is the target value (e.g., the total amount of transaction a merchant can have per day). $\hat{y}_i$ would be the projected amount as predicted by the model. n is the average transaction amount for the company.

For example, if a merchant receives (or a costumer spends) $10,000 dollars and the algorithm predicts $11,000 dollars the approach puts more emphasis on reducing this discrepancy as opposed to a merchant receiving 10 dollars (or a costumer spends) but the model estimating 100. In other words, the former has an error of $1,000 dollars and the latter only $90 in the eye of the model but the reality is the latter is a much bigger gap for the merchant (by an order of magnitude off in fact) whereas the former is only off by 0.1.

If this bias is not addressed in this scenario, the system favors highly larger businesses at the cost of inaccurately estimating smaller ones. To bring fairness to this process, Applicants proposed and devised a normalized cost function at the end of the training process to replace the alternate RMSE cost.

The output data set 188, 190, 192, 194 can be established for each of the estimated environmental scenarios under analysis using a combination of at least the first forecast future-state target variable 188, and the quantified sensitivity metric (e.g., weather 176 and climate 182). The environmental scenarios can be established using predicted weather data 184 and/or predicted climate data 186, for example. The sensitivity metrics being output can include the co-efficients of variation, as well as the second order co-efficients of variation.

Figure 11:
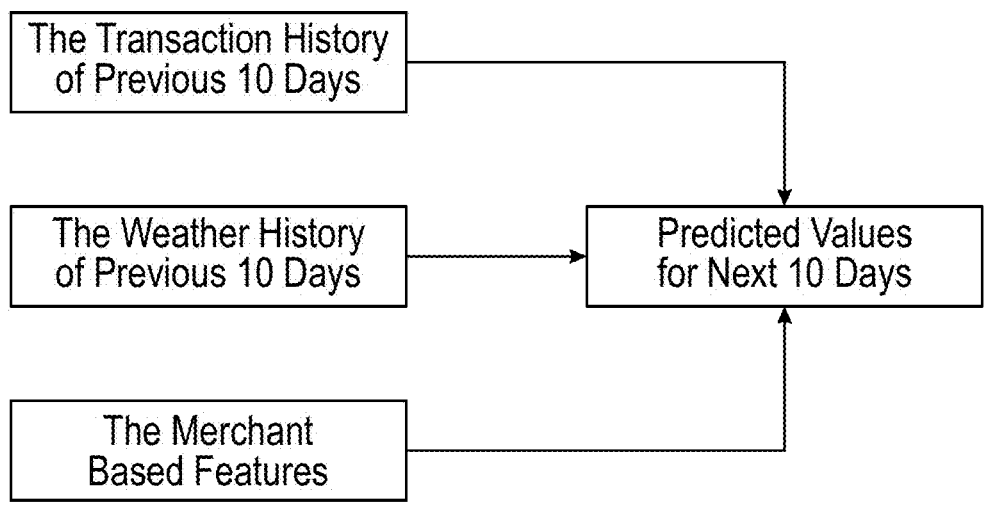
FIG. 11 is an example feature input mapped to an example output, according to some embodiments.

FIG. 11 is an example feature input mapped to an example output shown in diagram 1100, according to some embodiments. In this example, the input is a data set representing transaction history of a previous 10 days, along with weather history, and certain features to be tracked, and the output are predicted values for the next 10 days (e.g., given specific estimates for weather and/or climate). FIG. 12 is an example set of data outputs 1200, according to some embodiments. The outputs in this example can include transaction revenue forecasts given weather, quantified sensitivity forecasts, scenario estimation forecasts, among others.

Figure 13:
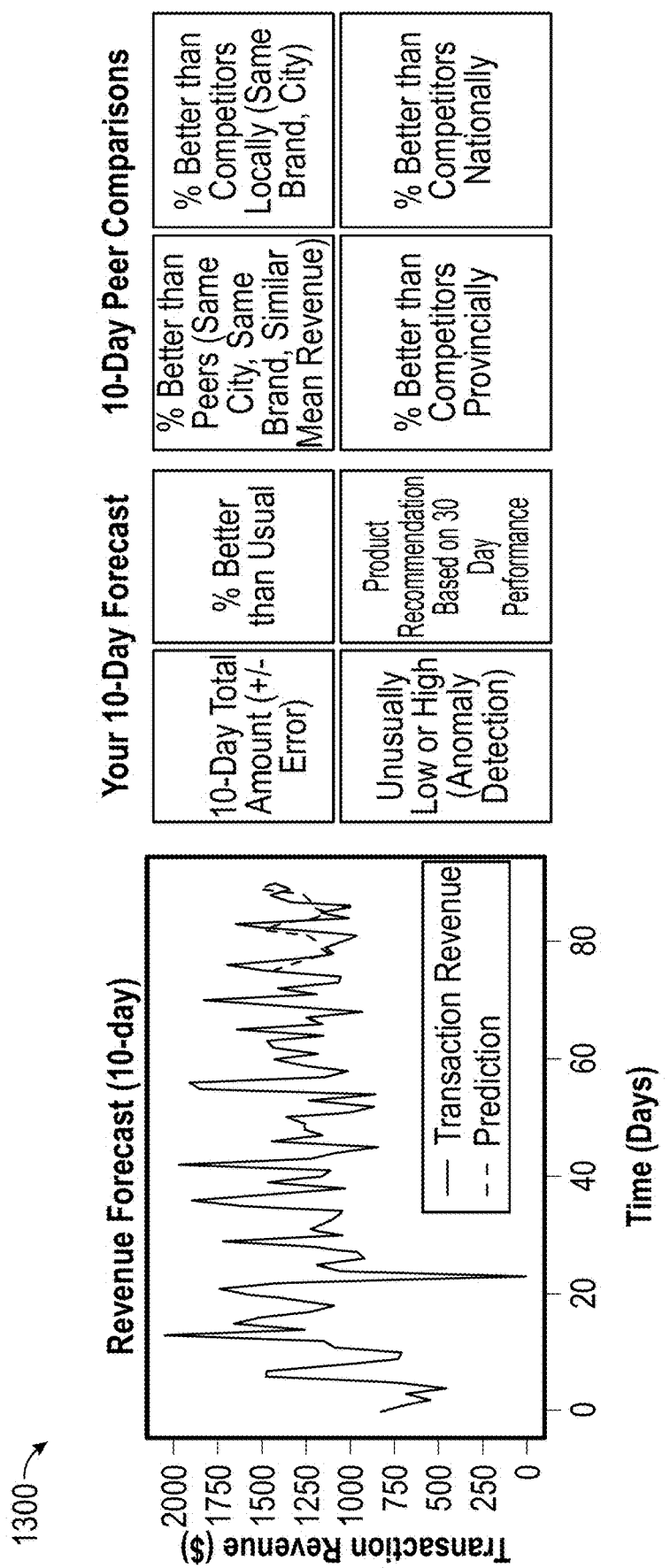
FIG. 13 is an example dashboard generated using the data outputs, according to some embodiments.
Figure 13:
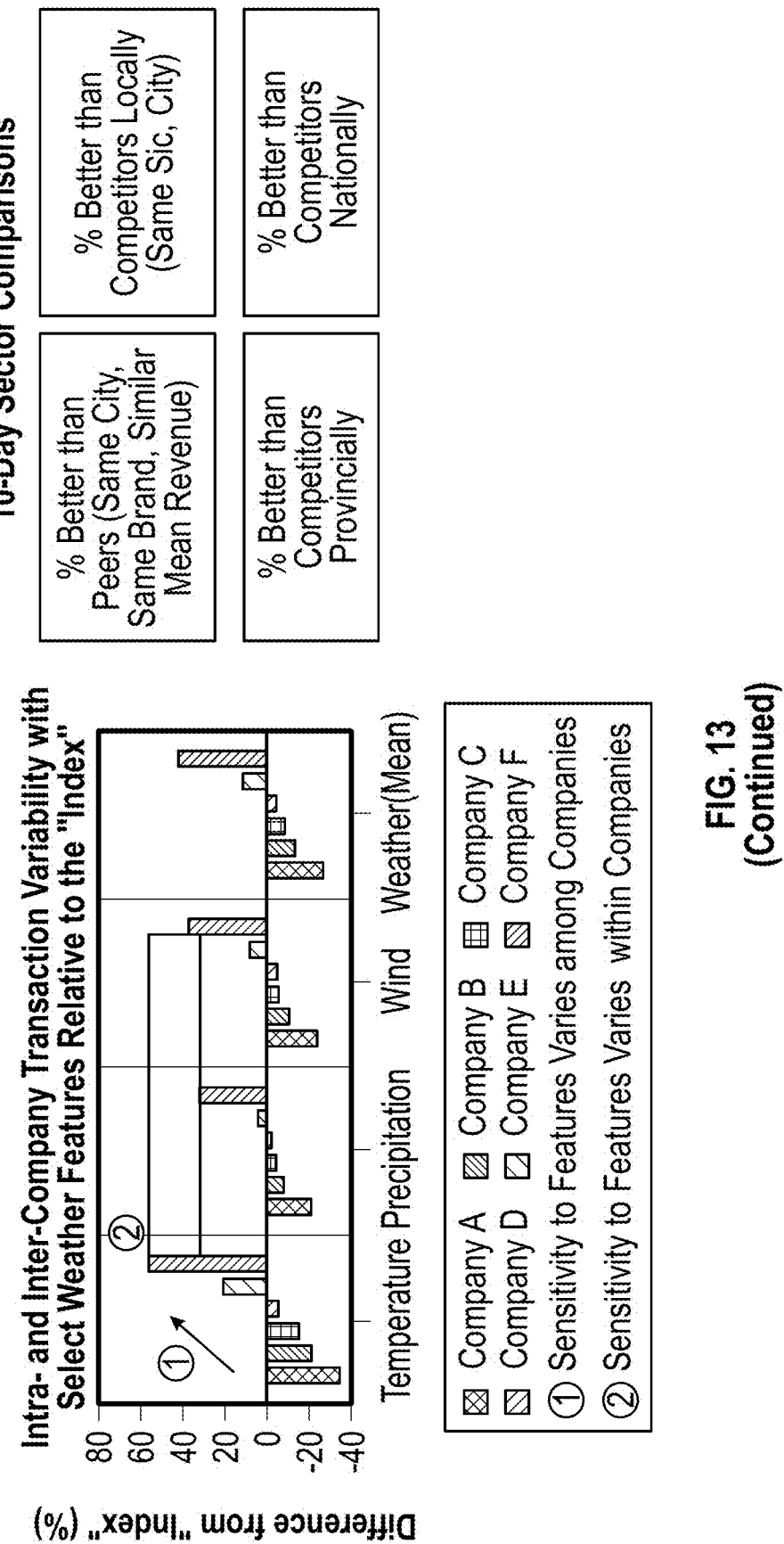

FIG. 13 is an example dashboard 1300 generated using the data outputs, according to some embodiments. The system can be used as a environmental effect simulator system. For example, IPCC climate scenario predictions can be obtained from ensemble models, and apply those climate to the model to generate outputs (e.g., this is how the business would perform). In the dashboard, there may be sliders or other types of interactive interface controls that can be utilized to modify and simulate dynamically modify parameters, such as simulating increased snowfall, rain, etc.

Responsive to these dynamic modifications (e.g., dragging a slider, turning a virtual knob), the model generated updated predictive outputs based on the trained models. In some embodiments, the dashboard 1300 is an interactive dashboard where visual elements are dynamically rendered responsive to movements of the controls. For example, a visualization graph may be generated showing a forecasted transaction amount or value for a business. The COV and/or SCOV can be utilized to prioritize which variables are adjustable in the dynamic dashboard 1300.

For example, the variables (or pairs thereof) having the highest COV can be adjustable, and the overall number of variables can be determined by the SCOV (e.g., a high SCOV may indicate that only a few variables are of interest, while a medium or low SCOV can indicate that there are more variables of interest). Accordingly, a number of knobs or sliders or other types of dynamic interactive elements can be instantiated based on the SCOV values.

The dashboard 1300 may utilize generated forecast information datasets output from the system to produce and/or render one or more interactive graphical user interfaces having interface elements that can generate graphs, charts, or numerical outputs to be rendered on a display screen. For example, the outputs can include peer comparisons, sector comparisons, business operations forecasts, revenue forecasts, among others. Given accurate weather or climate forecasting data (or scenarios), the data can be provided to generate forecasts for a variety of purposes, such as pricing, demand estimation, or climate change modelling. When the knobs or sliders are modified, the predicted weather data 184 or climate data 186 can be modified for applying through the models A, B and C 166, 168, 170 to generate updated results. Similarly, the system may operate with a number of instances in parallel, each instance relating to a particular company under analysis, and the dashboard 1300 may include visualizations from each instance graphically overlaid over one another (e.g., for a sector comparison or a peer comparison).

The embodiments are not limited only to weather and climate data, but alternate embodiments can be directed to other types of external periodic data, such as wind directions/magnitudes, interest rate changes due to government policy changes, among others. The target variable being forecasted can include, for example, transaction data, prices, among others. In a more specific example, a set of historical transaction data can be input, and the machine learning architecture may be configured to generate forecasted or machine generated future transaction data for a number of different environmental condition scenarios.

Figure 2:
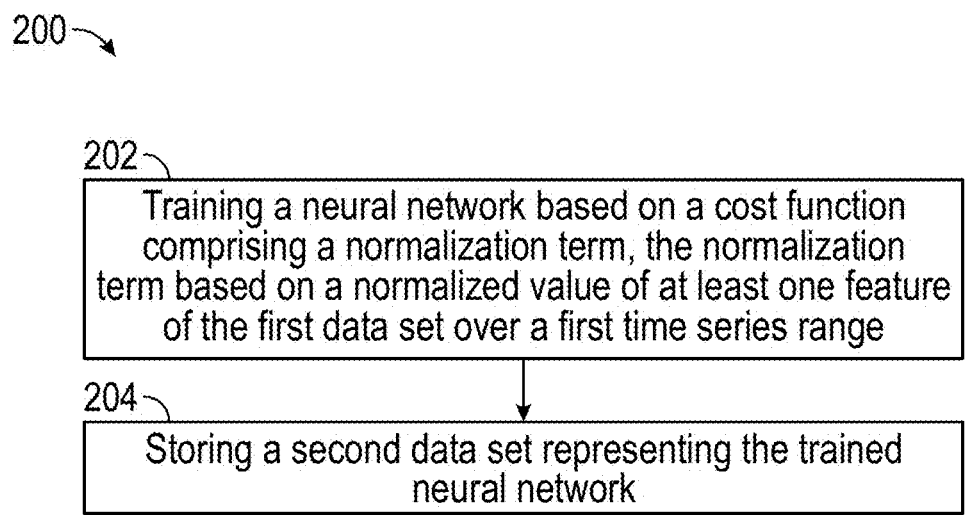
FIG. 2 shows an example method diagram for training neural networks, according to some embodiments.

Referring now to FIG. 2, and example method diagram to train a neural network is shown, according to some example embodiment.

At step 202, the neural network training unit 112 trains the neural network based on a cost function comprising a normalization term. In example embodiments, the normalization term is based on a normalized value of at least one feature of the first data set over a first time series range. For example, the normalization term may be based on an average daily transaction amount (AVG_AMT) feature of the historical transaction data set (referred to alternatively as RMSE_Normalized_AVG). For example, an example python script for the normalized term may be sqrt(mean ((outputi−targeti)2)/(AVG_AMT2)).

In example embodiments, the normalization term is based on a target value. For example, an example python script for the normalized term may be Normalized=sqrt(mean((outputi−targeti)2)/(targeti2)) (referred to alternatively as RMSE_Normalized_AVG). In example embodiments, the cost function is a root mean square error (referred to alternatively as RMSE).

At step 204, the neural network training unit 112 stores a second data set representing the trained neural network in memory 108A.

Figure 3:
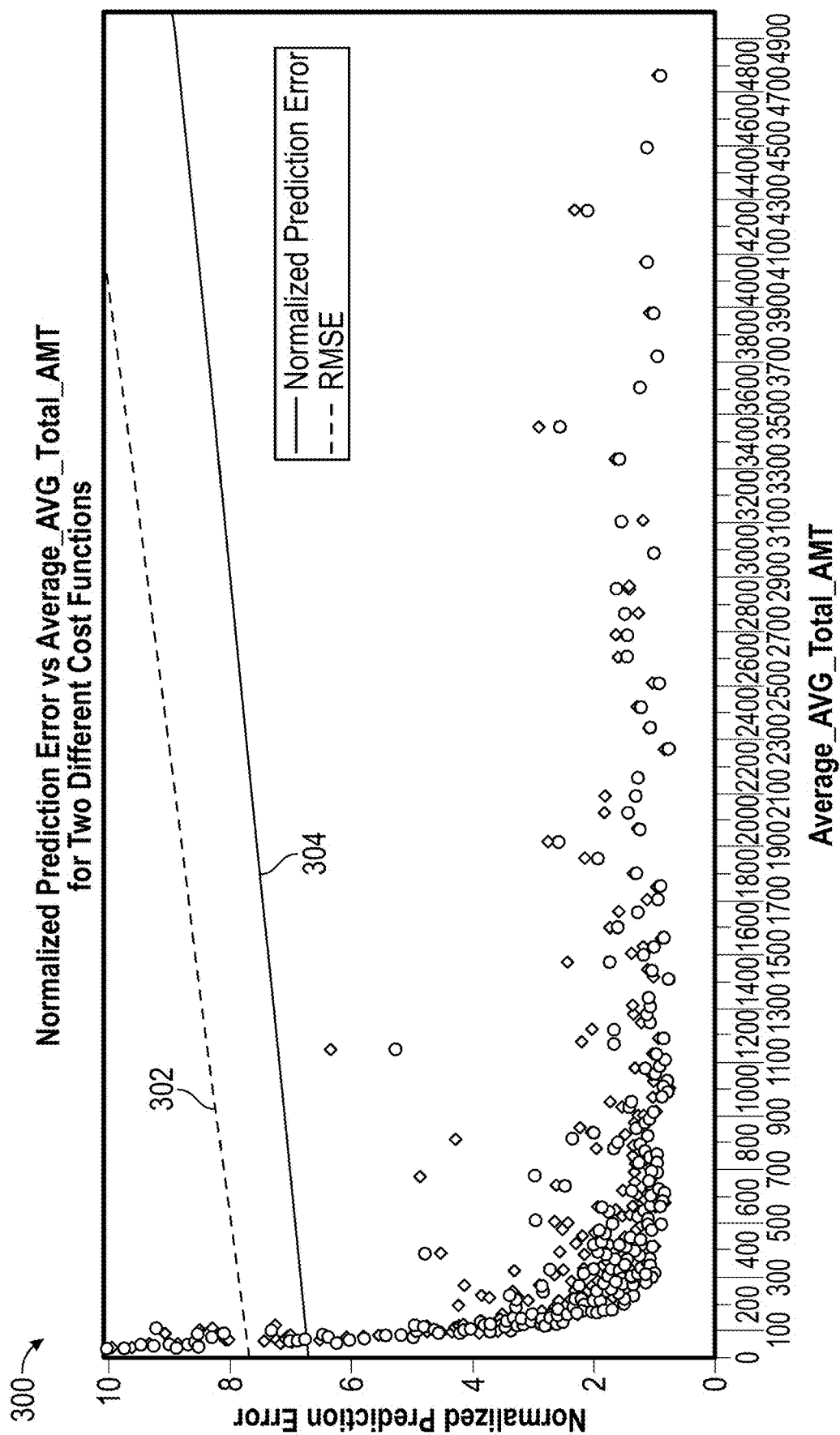
FIG. 3 shows an example graph diagram of neural network training results, according to some embodiments.

Referring now to FIG. 3, an example graph diagram of neural network training results according to various cost functions is shown. In FIG. 3, graph 300 shows a comparison of measured error between a neural network trained with the normalization term based on an average daily transaction amount as line 304 and a neural network trained with a RSME error term as line 302.

Table 1, shown below, similarly shows a comparison of the prediction error of a neural network comprising dense neural network architecture (as discussed herein) trained with the normalization term based on an average daily transaction amount.

TABLE 1

| Loss Function Test Prediction Error (based | Loss Function Test Prediction Error (based on RMSE) |
|---|---|
| RMSE | 1904 |
| RMSE_Normalized | 1921 |
| RMSE_Normalized_AVG | 1831 |

Figure 4:
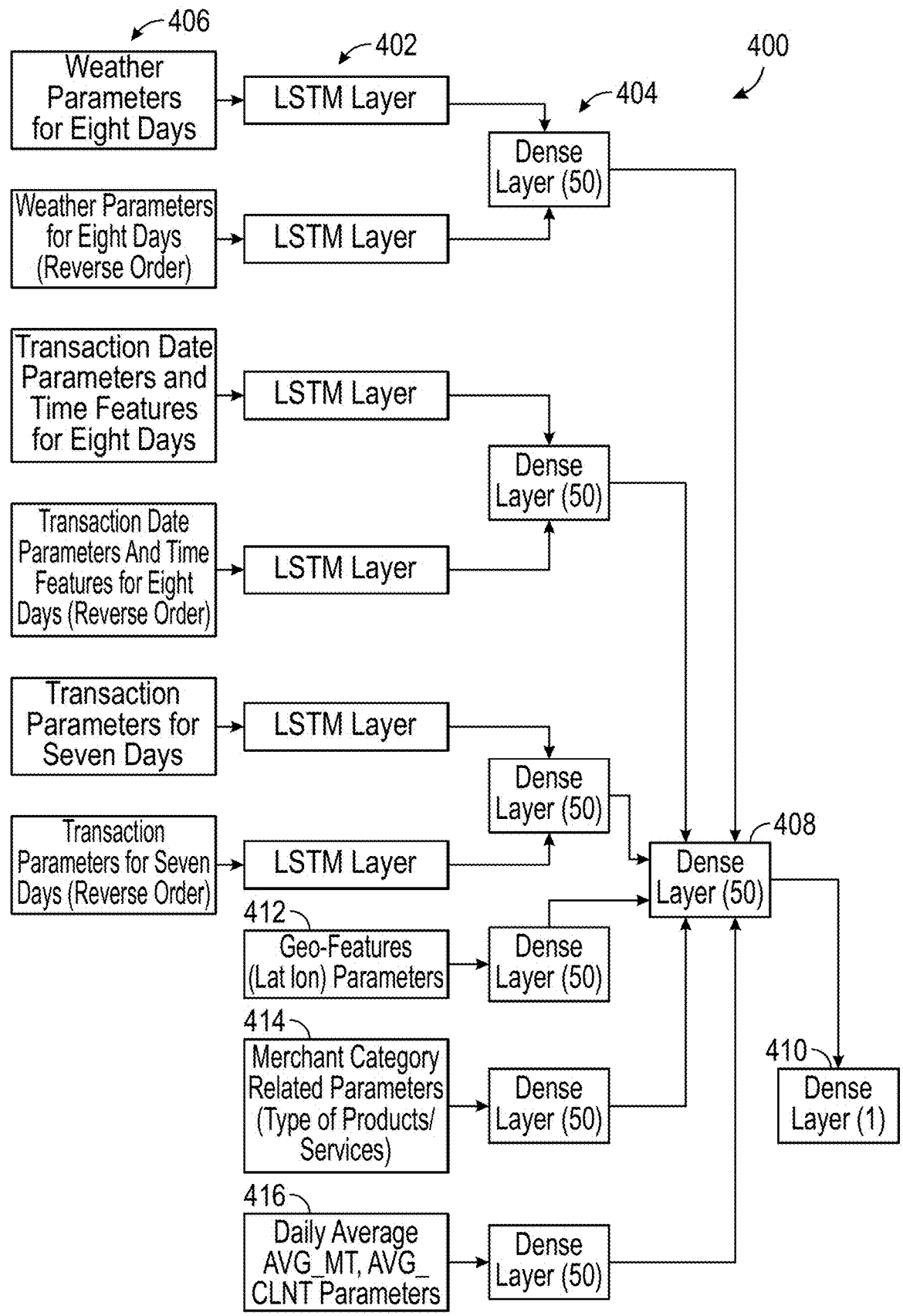
FIG. 4 shows an example diagram of recurrent neural network architecture, according to some embodiments.

Referring now to FIG. 4, an example neural network architecture is shown, according to some embodiments.

Neural network architecture 400 is shown comprising a subset of the first data set passing through various neural network elements, including an LSTM element 402. In example embodiments, the first data set is subdivided into subsets based on a desired time series. For example, in the shown embodiment, the subset of first data 406 comprises entries representing 8 days. The first data set can be subdivided into any combination of entries for any desired time series. In example embodiments, the first data set can be subdivided based on features. For example, in the embodiment shown in FIG. 4, the weather features are separated from the location features (e.g. geo-features 412), business type features 414, and transaction data features 416. The first data set can be subdivided into any combination of features for any desired time series. Generally, the first data set can be divided into any combination of features and entries.

As shown in neural network architecture 400, in example embodiments, the plurality of neural network elements comprise at least one LSTM and at least one dense neural network architecture 404. In example embodiments, the dense neural network architecture 404 may be configured to receive the output of an element 402. In the embodiment shown, dense neural network architectures can be arranged in series or in parallel, with the dense neural network architecture 408 arranged in series with the dense neural network architecture 410, for example.

The plurality of neural network elements comprising neural network architecture may comprise a recurrent neural network (RNN) or a plurality of RNN elements (or other neural network elements). In example embodiments, the neural network architecture 400 may comprise at least one LSTM 402.

For example, in the embodiment shown, dense neural network architecture 404 is connected to the LSTM element 402, such that an LSTM element's ability to retain information from previous inputs when processing successive inputs is utilized prior to passing information to a dense neural network element. In example embodiments, the neural network architecture 400 may be configured with an initial placement of the plurality of neural network elements such that the LSTM element receives the transaction data initially.

In example embodiments, the plurality of neural network elements comprising neural network architecture 400 may comprise a transformer element (not shown). In some embodiments, for example, the transformer elements are based on an internal attention mechanism configured to sample the plurality of entries of the first data set for a second time series range. For example, a transformer element may be used to merge geospatial and temporal information with the financial and transactional data to model the impact of weather as well as location on specific businesses.

In example embodiments, any number of LSTM elements, dense neural network architectures, and transformers may be connected, either in series or in parallel, to form the neural network architecture. For example, separate LSTM elements and dense neural network architectures may be connected in series for each time sensitive feature. According to some example embodiments, subsets of the first data set comprising temporal features may be provided to separate elements, such as providing weather data to both an LSTM element and a transformer element.

Figure 5:
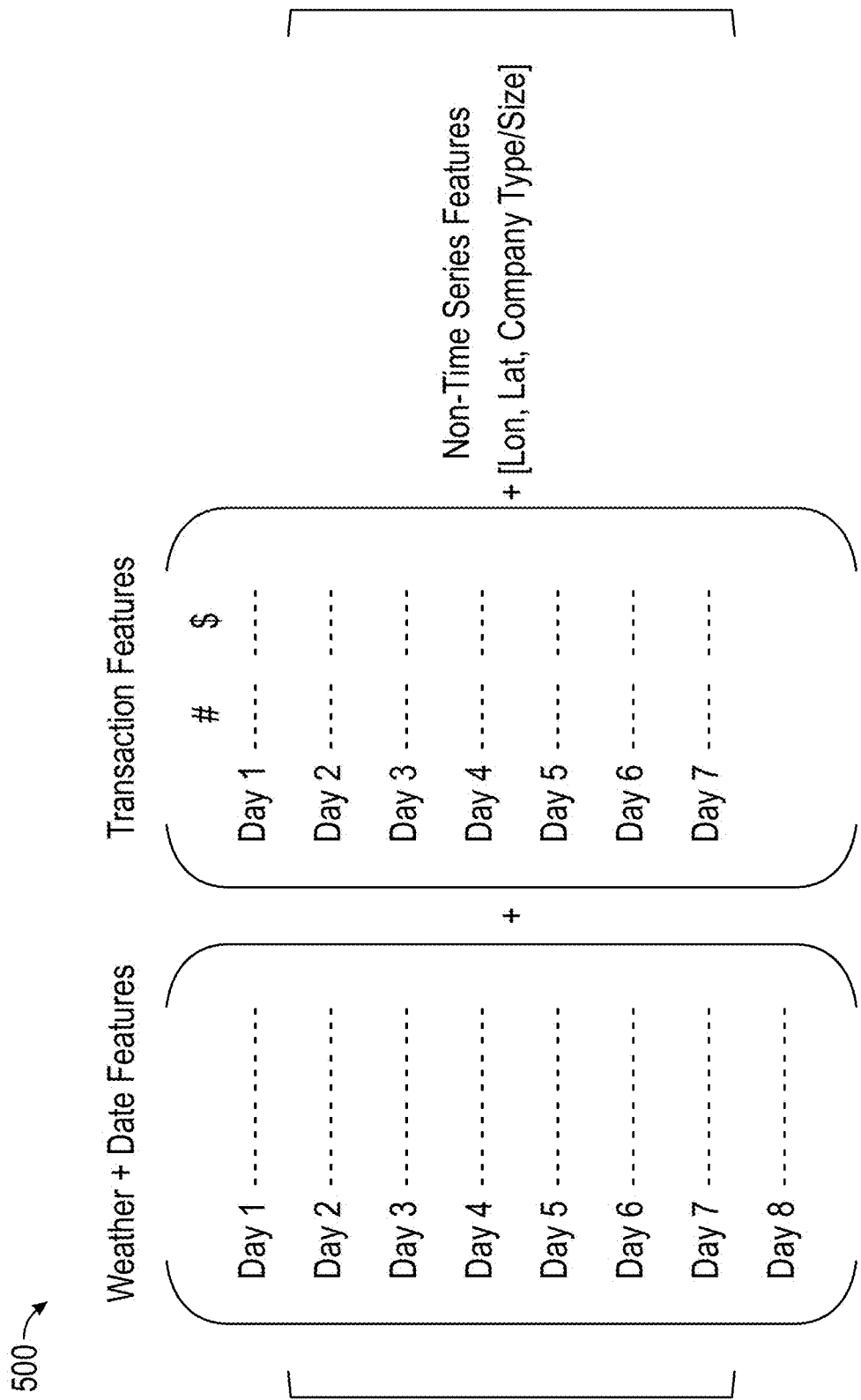
FIG. 5 shows an example diagram of a neural network architecture, according to some embodiments.

Data from the first data set may be rearranged in various orders prior to being passed through various neural network architecture 400 elements. For example a time series data set may be provided to a first LSTM element in ascending chronological order, and to a transformer element in descending chronological order. Referring now to FIG. 5, an example data structure 500 provided to the neural network architecture 400 is shown, with weather data, transaction data, and location/business type data separated.

In example embodiments, different subsets of the first data set may be provided to various elements in any order. For example, data may be passed through elements of the neural network architecture 400 according to a data proportion threshold. For example, the first data set may comprise a business identifier feature, and the first data set may incorporate or adhere to a data proportion threshold value of a maximum of 100 entries for each unique business identifier feature. For example, an example python script for a subset of the first data set may be train_dataset, test_dataset=train_test split (array_shuffle, test_size=0.2, random_state=42, stratify=[i[7] for i in array_shuffle]).

In example embodiments, each feature in the first data set is scaled separately by the scaling unit 118, to reshape specific sets of features based on number of entries in that set. For example, scaling unit 118 may be configured with the following python code: #Weather Features Scaling scaler_1=preprocessing.MinMaxScaler(feature_range=(0, 1)) num_instances, num_time_steps, num_features=np.array (Model1_train_x).shape Model1_train_x=np.reshape(Model1_train_x, (−1, num_features)) Model1_train_x=910 scaler_1.fit_transform (Model1_train_x) Model1_train_x=np.reshape (Model1_train_x, (num_instances, num_time_steps, num_features)).

Table 2, shown below, shows a comparison of the prediction error of a neural network comprising dense neural network architecture and LSTM elements, described in FIG. 4, applied to a training data set and a test data set:

TABLE 2

| Train Prediction Error (RMSE) | Test Prediction Error (RMSE) |
|---|---|
| 1613 | 2613 |

Referring again to FIG. 2, at step 204, the neural network training unit 112 stores a second data set representing the trained neural network in memory.

In example embodiments, the first platform 100A receives an input data set comprising an input business type data set, an input desired times series data set, and an input location data set. The neural network processing unit 114 may be configured to pass the input data set through the trained neural network to generate a processed data set comprising expected transaction data and store the processed data. For example, the neural network processing unit 114 may generate a processed data set, based on input data set specifying a location, and clothing retailer, and a desired time set in the future, with an expected transaction data representing the expected transactions of the clothing retailer during the desired time set.

Figure 14:
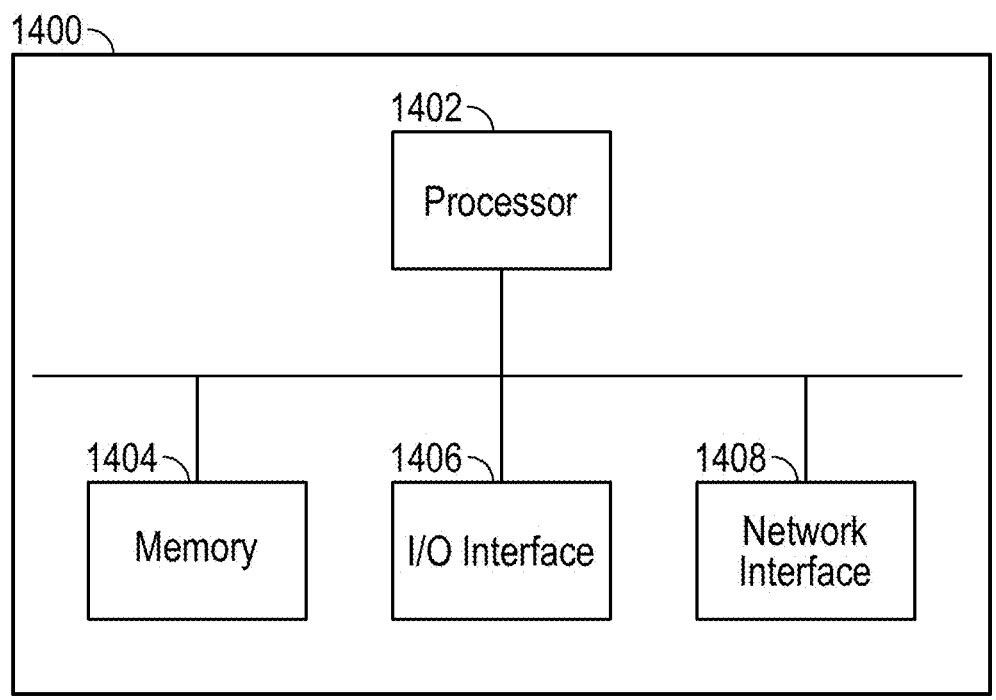
FIG. 14 shows an example diagram of an example computing device, according to some embodiments.

FIG. 14 is a schematic diagram of computing device 1400, exemplary of an embodiment. As depicted, computing device 1400 includes at least one processor 1402, memory 1404, at least one I/O interface 1406, and at least one network interface 1408.

For simplicity only one computing device 1400 is shown but system may include more computing devices 1400 operable by users to access remote network resources 120 and exchange data. The computing devices 1400 may be the same or different types of devices. The computing device 1400 includes at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a computer or any other computing device capable of being configured to carry out the methods described herein.

Each processor 1402 may be, for example, a microprocessor or microcontroller, a digital signal processing (DSP) processor, an integrated circuit, a field programmable gate array (FPGA), a reconfigurable processor, a programmable read-only memory (PROM), or combinations thereof.

Memory 1404 may include combinations of computer memory that is located either internally or externally such as, for example, random-access memory (RAM), read-only memory (ROM), compact disc read-only memory (CD-ROM), electro-optical memory, magneto-optical memory, erasable programmable read-only memory (EPROM), and electrically-erasable programmable read-only memory (EEPROM), ferroelectric RAM (FRAM) or the like.

Each I/O interface 1406 enables computing device 1400 to interconnect with one or more input devices, such as a keyboard, mouse, camera, touch screen and a microphone, or with one or more output devices such as a display screen and a speaker.

Each network interface 1408 enables computing device 1400 to communicate with other components, to exchange data with other components, to access and connect to network resources, such as network 120, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 1400 can be operable to register and authenticate users (using a login, unique identifier, and password for example) prior to providing access to applications, a local network, and network resources, other networks and network security devices. Computing device 1400 may serve one user or multiple users. These users, for example, can include users of the dashboard 1300.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized and are contemplated. Accordingly. embodiments are intended to include within their scope such processes, machines, manufacture, compositions of matter, means, methods, or steps.

As can be understood, the examples described above and illustrated are intended to be exemplary only. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A computer system for generating computerized predictions from first, second, and third data model architectures given one or more estimated environmental scenarios, the system comprising:
   one or more processors operating with computer memory and non-transitory computer readable media, the one or more processors configured to:
   receive a historical weather time-series data set and a historical climate time-series data set representative of environmental conditions present during one or more corresponding durations of time;
   receive one or more target variable time-series historical data sets;
   receive a predicted weather time-series data set and a predicted climate time-series data set representative of the one or more estimated environmental scenarios;

instantiate the first data model architecture configured to generate a first forecast future-state target variable for predicted environmental conditions obtained from the predicted weather time-series data set and the predicted climate time-series data set;

generate an intermediate de-trended target variable historical data set using a plurality of analogous waveform transformation features extracted from the one or more target variable time-series historical data sets, wherein the plurality of analogous waveform transformation features include amplitudes and periods of a plurality of cyclical variations at different frequencies in the one or more target variable time-series historical data sets indicated by timestamps;

instantiate the second data model architecture configured to utilize the intermediate de-trended target variable historical data set to determine a quantified weather sensitivity metric using at least a first or a second order co-efficient of variation using the historical weather time-series data set;

instantiate the third data model architecture configured to utilize the intermediate de-trended target variable historical data set to determine a quantified climate sensitivity metric using at least a first or a second order co-efficient of variation using the historical climate time-series data set;

wherein each of the first, second, and third data model architectures comprises at least one long short term memory model architecture, at least one dense neural network architecture and at least one transformer connected in at least one of a series and parallel arrangement such that the at least one long short term memory model architecture retains information from an input data set prior to passing the information from the input data set to the at least one dense neural network architecture, and the at least one transformer is configured to merge geospatial and temporal information with feature data from the input data set to model an impact of the environmental conditions on a specific feature;

generate an output data set representative of the computerized predictions for the one or more estimated environmental scenarios to determine a target variable given the predicted environmental conditions, encapsulated alongside the quantified weather sensitivity metric, and the quantified climate sensitivity metric, and render a dynamic visual dashboard for downstream analytics using the output data set, wherein the first and the second order co-efficients of variation using the historical weather time-series data set and the historical climate time-series data set are used to prioritize a plurality of variables to be adjustable in the dynamic visual dashboard, wherein the dynamic visual dashboard includes a plurality of interactive interface controls that are utilized to modify the plurality of variables and simulate values of the plurality of variables predicted by each of the first, second, and third data model architectures, wherein the plurality of interactive interface controls are instantiated based on the first and the second order co-efficients of variation using the historical weather time-series data set and the historical climate time-series data set.

2. The system of claim 1, wherein the one or more target variable time-series historical data sets are pre-processed by applying periodic discrete time encoding, wherein the periodic discrete time encoding is utilized to encode features associated with date-time values associated with data values of the one or more target variable time-series historical data sets indicating whether a date-time comprises at least one of a weekday, a weekend, a holiday, and a week of a month.

3. The system of claim 2, wherein a cost function applied to each of the first, second, and third data model architectures includes using both a recurrent neural network and a decision tree regressor on pre-processed time-encoded features.

4. The system of claim 1, wherein the first, second, and third data model architectures utilize parallel decision tree architectures.

5. The system of claim 1, wherein the target variable time-series historical data sets include transaction data, and the output data set includes a predicted set of transaction data for each of the one or more estimated environmental scenarios.

6. The system of claim 1, wherein the first and the second order co-efficient of variation using the historical weather time-series data set and the first and the second order co-efficient of variation using the historical climate time-series data set are determined for one or more underlying environmental variables corresponding to at least one of weather and climate.

7. The system of claim 1, wherein a display is configured to render the dynamic visual dashboard on a graphical user interface.

8. The system of claim 7, wherein the dynamic visual dashboard includes generated computerized predictions for one or more peer companies or one or more sector companies, and the dynamic visual dashboard includes a graph comparing a target company against the one or more peer companies or the one or more sector companies.

9. The system of claim 7, wherein the dynamic visual dashboard includes generated computerized predictions for two or more different estimated environmental scenarios, and the dynamic visual dashboard includes a graph comparing the generated computerized predictions for the two or more different estimated environmental scenarios.

10. The system of claim 1, wherein the one or more processors provide a parallel processing environment having a plurality of processor cores, threads, or processes.

11. A computer method for generating computerized predictions from first, second, and third data model architectures given one or more estimated environmental scenarios, the method comprising:

receiving a historical weather time-series data set and a historical climate time-series data set representative of environmental conditions present during one or more corresponding durations of time;

receiving one or more target variable time-series historical data sets;

receiving a predicted weather time-series data set and a predicted climate time-series data set representative of the one or more estimated environmental scenarios;

instantiating the first data model architecture configured to generate a first forecast future-state target variable for predicted environmental conditions obtained from the predicted weather time-series data set and the predicted climate time-series data set;

generating an intermediate de-trended target variable historical data set using a plurality of analogous waveform transformation features extracted from the one or more target variable time-series historical data sets, wherein the plurality of analogous waveform transformation features include amplitudes and periods of a plurality of cyclical variations at different frequencies in the one or more target variable time-series historical data sets indicated by timestamps;

instantiating the second data model architecture configured to utilize the intermediate de-trended target variable historical data set to determine a quantified weather sensitivity metric using at least a first or a second order co-efficient of variation using the historical weather time-series data set;

instantiating the third data model architecture configured to utilize the intermediate de-trended target variable historical data set to determine a quantified climate sensitivity metric using at least a first or a second order co-efficient of variation using the historical climate time-series data set;

wherein each of the first, second, and third data model architectures comprises at least one long short term memory model architecture, at least one dense neural network architecture and at least one transformer connected in at least one of a series and parallel arrangement such that the at least one long short term memory model architecture retains information from an input data set prior to passing the information from the input data set to the at least one dense neural network architecture, and the at least one transformer is configured to merge geospatial and temporal information with feature data from the input data set to model an impact of the environmental conditions on a specific feature;

generating an output data set representative of the computerized predictions for the one or more estimated environmental scenarios to determine a target variable given the predicted environmental conditions, encapsulated alongside the quantified weather sensitivity metric, and the quantified climate sensitivity metric, and rendering a dynamic visual dashboard for downstream analytics using the output data set, wherein the first and the second order co-efficients of variation using the historical weather time-series data set and the historical climate time-series data set are used to prioritize a plurality of variables to be adjustable in the dynamic visual dashboard, wherein the dynamic visual dashboard includes a plurality of interactive interface controls that are utilized to modify the plurality of variables and simulate values of the plurality of variables predicted by each of the first, second, and third data model architectures, wherein the plurality of interactive interface controls are instantiated based on the first and the second order co-efficients of variation using the historical weather time-series data set and the historical climate time-series data set.

12. The method of claim 11, wherein the one or more target variable time-series historical data sets are pre-processed by applying periodic discrete time encoding, wherein the periodic discrete time encoding is utilized to encode features associated with date-time values associated with data values of the one or more target variable time-series historical data sets indicating whether that-a date-time comprises at least one of a weekday, a weekend, a holiday, and a week of a month and a specific holiday.

13. The method of claim 12, wherein a cost function applied to each of the first, second, and third data model architectures includes using both a recurrent neural network and a decision tree regressor on pre-processed time-encoded features.

14. The method of claim 11, wherein the first, second, and third data model architectures utilize parallel decision tree architectures.

15. The method of claim 11, wherein the target variable time-series historical data sets include transaction data, and the output data set includes a predicted set of transaction data for each of the one or more estimated environmental scenarios.

16. The method of claim 11, wherein the first and the second order co-efficient of variation using the historical weather time-series data set and the first and the second order co-efficient of variation using the historical climate time-series data set are determined for one or more underlying environmental variables corresponding to at least one of weather and climate.

17. The method of claim 11, wherein a display is configured to render the dynamic visual dashboard on a graphical user interface.

18. The method of claim 17, wherein the dynamic visual dashboard includes generated computerized predictions for one or more peer companies or one or more sector companies, and the dynamic visual dashboard includes a graph comparing a target company against the one or more peer companies or the one or more sector companies.

19. The method of claim 17, wherein the dynamic visual dashboard includes generated computerized predictions for two or more different estimated environmental scenarios, and the dynamic visual dashboard includes a graph comparing the generated computerized predictions for the two or more different estimated environmental scenarios.

20. A non-transitory computer readable medium storing computer-interpretable instructions, which when executed by a processor, cause the processor to perform a method for generating computerized predictions from first, second, and third data model architectures given one or more estimated environmental scenarios, the method comprising:

receiving a historical weather time-series data set and a historical climate time-series data set representative of environmental conditions present during one or more corresponding durations of time;

receiving one or more target variable time-series historical data sets;

receiving a predicted weather time-series data set and a predicted climate time-series data set representative of the one or more estimated environmental scenarios;

instantiating the first data model architecture configured to generate a first forecast future-state target variable for predicted environmental conditions obtained from the predicted weather time-series data set and the predicted climate time-series data set;

generating an intermediate de-trended target variable historical data set using a plurality of analogous waveform transformation features extracted from the one or more target variable time-series historical data sets, wherein the plurality of analogous waveform transformation features include amplitudes and periods of a plurality of cyclical variations at different frequencies in the one or more target variable time-series historical data sets indicated by timestamps;

instantiating the second data model architecture configured to utilize the intermediate de-trended target variable historical data set to determine a quantified weather sensitivity metric using at least a first or a second order co-efficient of variation using the historical weather time-series data set;

instantiating the third data model architecture configured to utilize the intermediate de-trended target variable historical data set to determine a quantified climate sensitivity metric using at least a first or a second order co-efficient of variation using the historical climate time-series data set;

wherein each of the first, second, and third data model architectures comprises at least one long short term memory model architecture, at least one dense neural network architecture and at least one transformer connected in at least one of a series and parallel arrangement such that the at least one long short term memory model architecture retains information from an input data set prior to passing the information from the input data set to the at least one dense neural network architecture, and the at least one transformer is configured to merge geospatial and temporal information with feature data from the input data set to model an impact of the environmental conditions on a specific feature;

generating an output data set representative of the computerized predictions for the one or more estimated environmental scenarios to determine a target variable given the predicted environmental conditions, encapsulated alongside the quantified weather sensitivity metric, and the quantified climate sensitivity metric, and rendering a dynamic visual dashboard for downstream analytics using the output data set, wherein the first and the second order co-efficients of variation using the historical weather time-series data set and the historical climate time-series data set are used to prioritize a plurality of variables to be adjustable in the dynamic visual dashboard, wherein the dynamic visual dashboard includes a plurality of interactive interface controls that are utilized to modify the plurality of variables and simulate values of the plurality of variables predicted by each of the first, second, and third data model architectures, wherein the plurality of interactive interface controls are instantiated based on the first and the second order co-efficients of variation using the historical weather time-series data set and the historical climate time-series data set.

* * * * *